(12) United States Patent
Takyo

(10) Patent No.: US 11,855,575 B2
(45) Date of Patent: Dec. 26, 2023

(54) STEP MOTOR DRIVE DEVICE

(71) Applicant: CITIZEN WATCH CO., LTD., Tokyo (JP)

(72) Inventor: Yu Takyo, Nishitokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 152 days.

(21) Appl. No.: 17/763,210

(22) PCT Filed: Aug. 26, 2020

(86) PCT No.: PCT/JP2020/032215
§ 371 (c)(1),
(2) Date: Mar. 24, 2022

(87) PCT Pub. No.: WO2021/059837
PCT Pub. Date: Apr. 1, 2021

(65) Prior Publication Data
US 2023/0291338 A1   Sep. 14, 2023

(30) Foreign Application Priority Data
Sep. 25, 2019   (JP) .................................. 2019-174191

(51) Int. Cl.
*H02P 8/02* (2006.01)
*G04C 3/14* (2006.01)

(52) U.S. Cl.
CPC ................ *H02P 8/02* (2013.01); *G04C 3/143* (2013.01)

(58) Field of Classification Search
CPC ..... H02P 8/02; H02P 8/38; H02P 8/14; G04C 3/143; G04C 3/14; G05B 19/39
See application file for complete search history.

(56) References Cited

U.S. PATENT DOCUMENTS 4,542,329 A   9/1985  Tu
5,166,590 A   11/1992 Tu et al.
(Continued)

FOREIGN PATENT DOCUMENTS

CH        266366 A4   3/1968
CN    107222141 A    9/2017
(Continued)

OTHER PUBLICATIONS

International Search Report for PCT/JP2020/032215 dated Oct. 27, 2020, with English translation.
(Continued)

*Primary Examiner* — Said Bouziane
(74) *Attorney, Agent, or Firm* — HEA LAW PLLC

(57) ABSTRACT

A step motor drive device includes a step motor including a rotor, stators, and a coil, a drive circuit that outputs a drive signal including a plurality of partial signals that are output intermittently, a detecting circuit that detects an electromagnetic induced current that is generated in the coil after the partial signals are output, and a control unit that controls the drive circuit. The drive circuit outputs one of the partial signals included in the drive signal to the coil, and, in response to a change in an electromagnetic induced current generated in the coil after the partial signal is output, outputs a next partial signal to the coil. The control unit determines a control method of the step motor based on an interval of the plurality of partial signals, and controls the drive circuit based on the determined control method.

21 Claims, 35 Drawing Sheets

(56) References Cited

U.S. PATENT DOCUMENTS

| | | | |
|---|---|---|---|
| 5,247,235 A | 9/1993 | Tu et al. | |
| 6,262,554 B1 * | 7/2001 | Kojima | H02P 8/14 |
| 2015/0160619 A1 | 6/2015 | Takyo et al. | |
| 2017/0261939 A1 | 9/2017 | Hosobuchi | |
| 2017/0277130 A1 | 9/2017 | Saito | |
| 2017/0322518 A1 | 11/2017 | Iri et al. | |
| 2018/0246471 A1 | 8/2018 | Takyoh et al. | |
| 2019/0058424 A1 | 2/2019 | Ito | |
| 2019/0332065 A1 | 10/2019 | Saito | |
| 2020/0019124 A1 | 1/2020 | Takyoh et al. | |

FOREIGN PATENT DOCUMENTS

| | | |
|---|---|---|
| CN | 108027585 A | 5/2018 |
| EP | 1032118 A1 | 8/2000 |
| GB | 1145253 A | 3/1969 |
| JP | H0233108 B2 | 7/1990 |
| JP | 2739259 B2 | 4/1998 |
| JP | 2913307 B2 | 6/1999 |
| JP | 2001307269 A | 11/2001 |
| JP | 2003259692 A | 9/2003 |
| JP | 2003333896 A | 11/2003 |
| JP | 2009213221 A | 9/2009 |
| JP | 2014219231 A | 11/2014 |
| JP | 2016003877 A | 1/2016 |
| JP | 2017090362 A | 5/2017 |
| JP | 2017163766 A | 9/2017 |
| JP | 2018169410 A | 11/2018 |
| JP | 2019037087 A | 3/2019 |
| WO | 2007041387 A2 | 4/2007 |

OTHER PUBLICATIONS

Office Action dated May 19, 2023, for corresponding CN patent application No. 202080068265.9, and partial translation thereof, pp. 1-8.

* cited by examiner

FIG.4
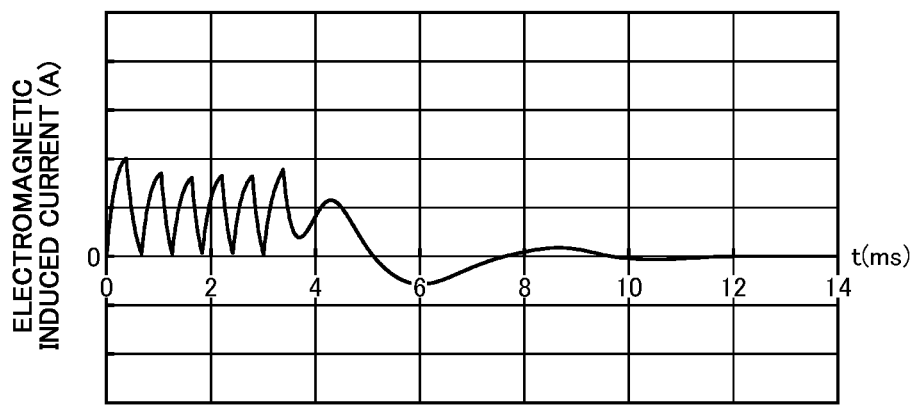
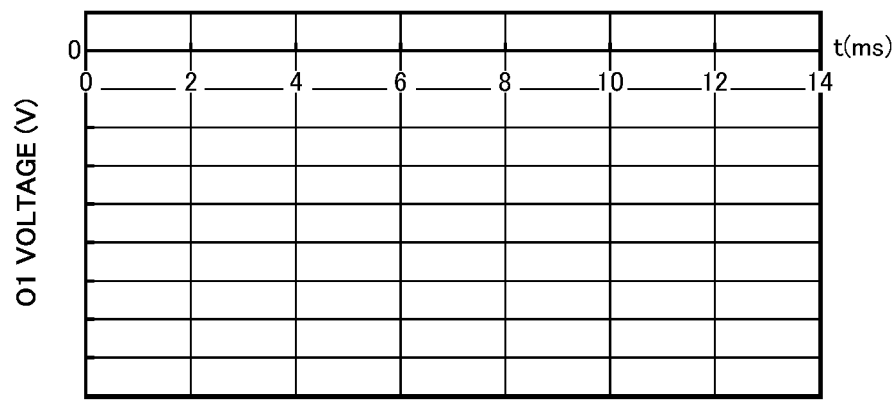
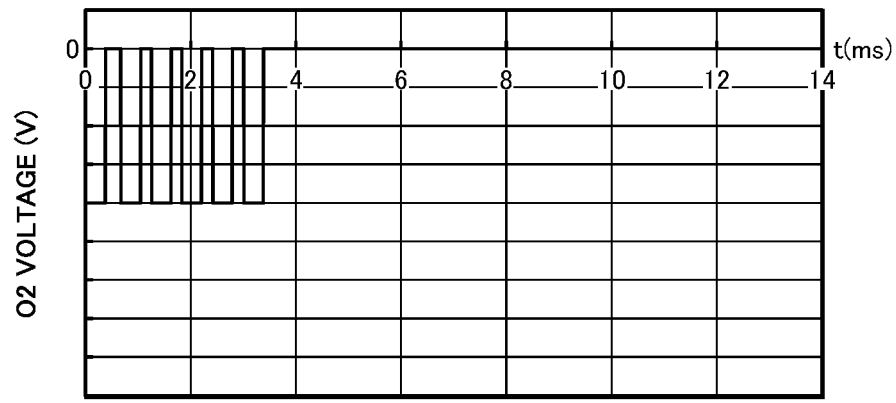

FIG.6
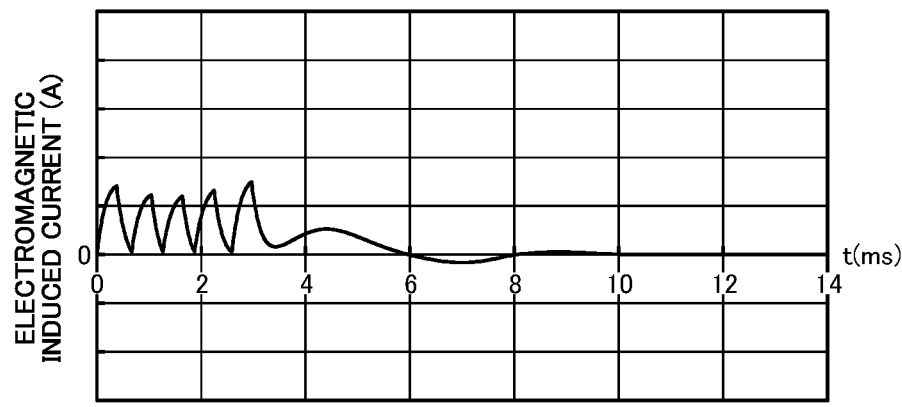
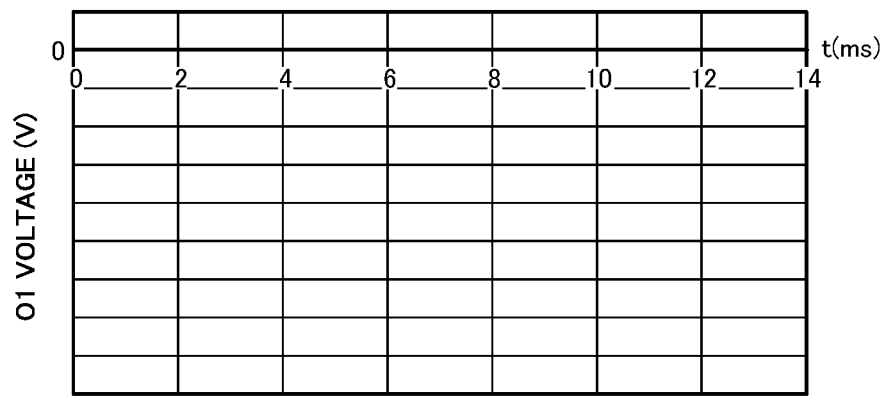
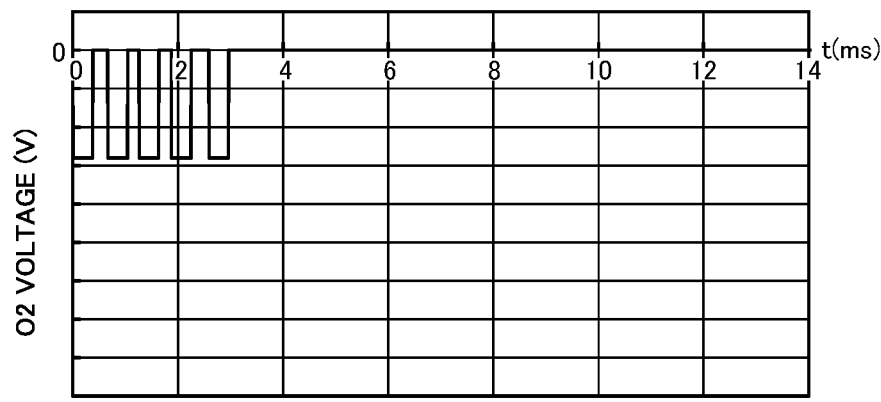

FIG.21
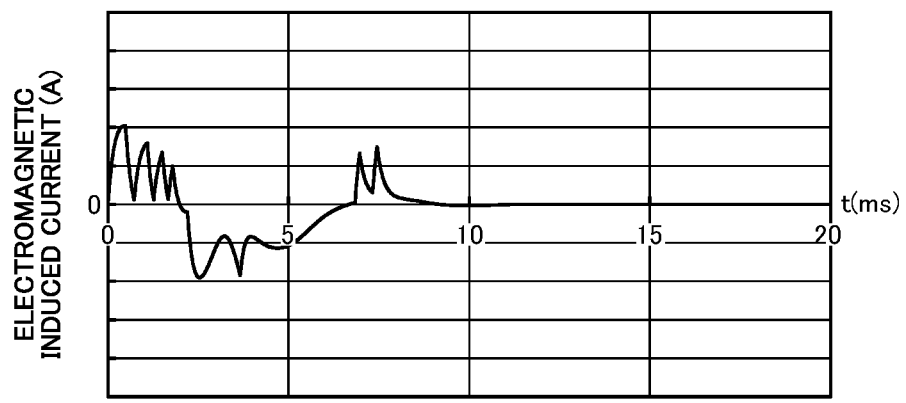
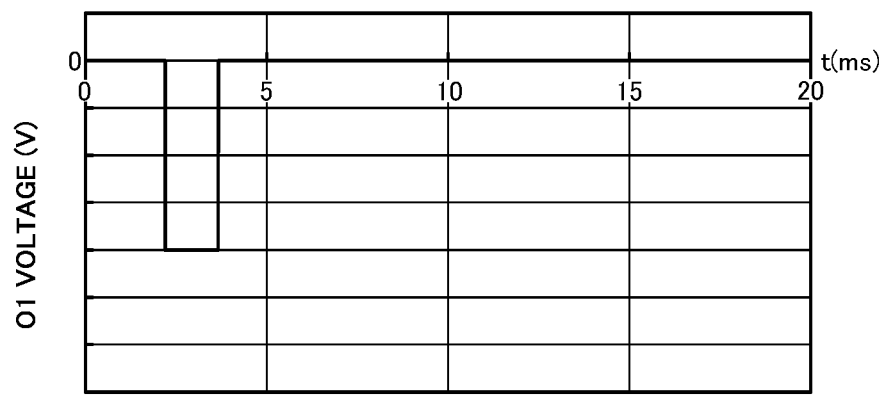
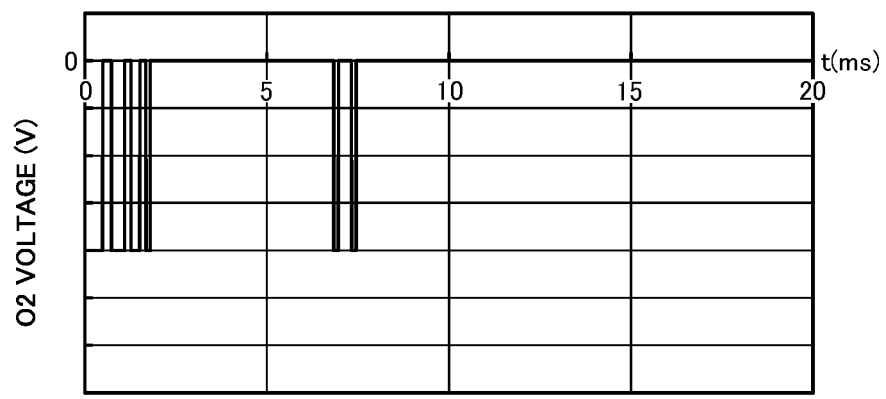

FIG.23
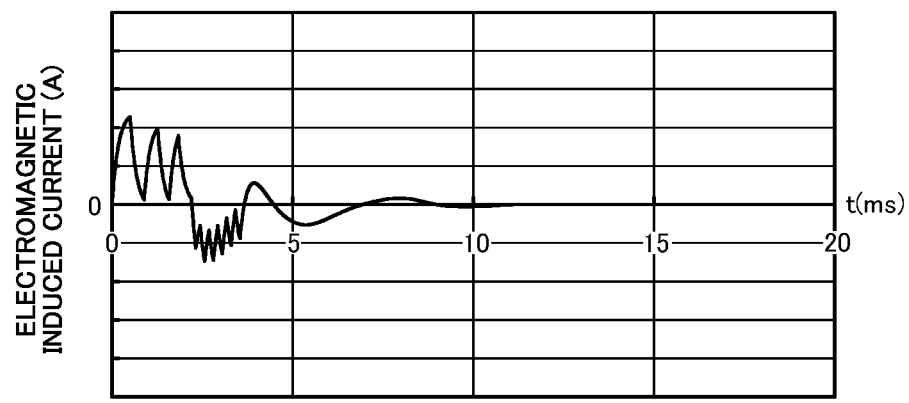
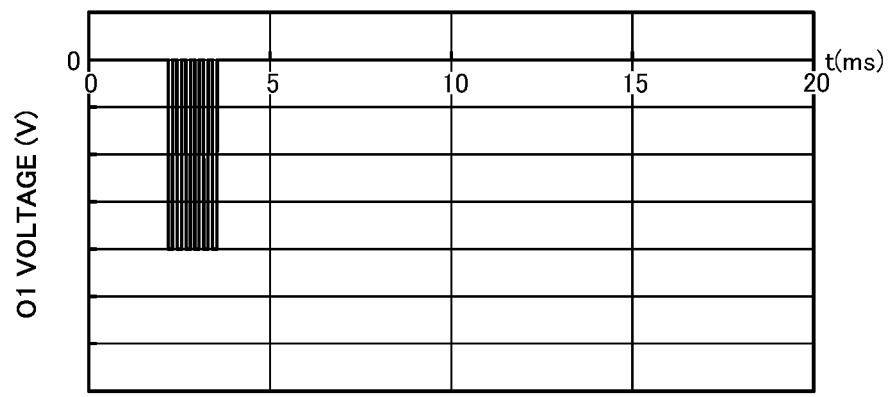
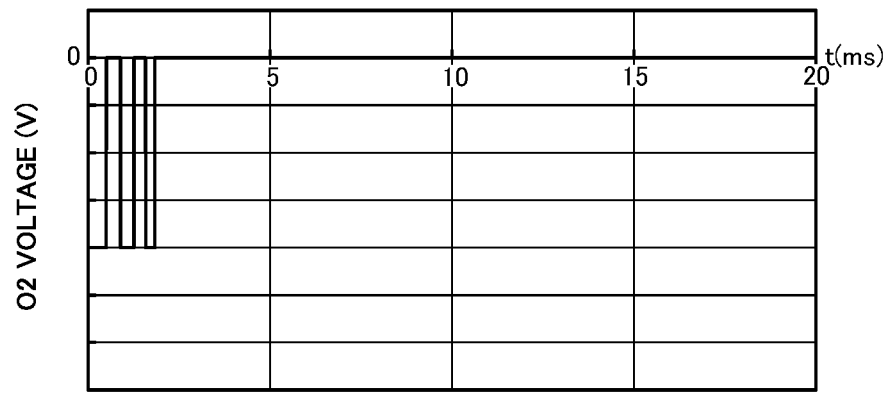

FIG.25
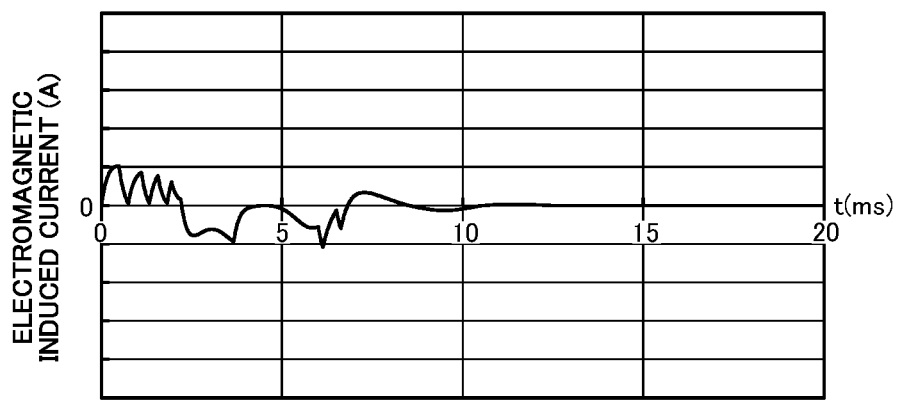
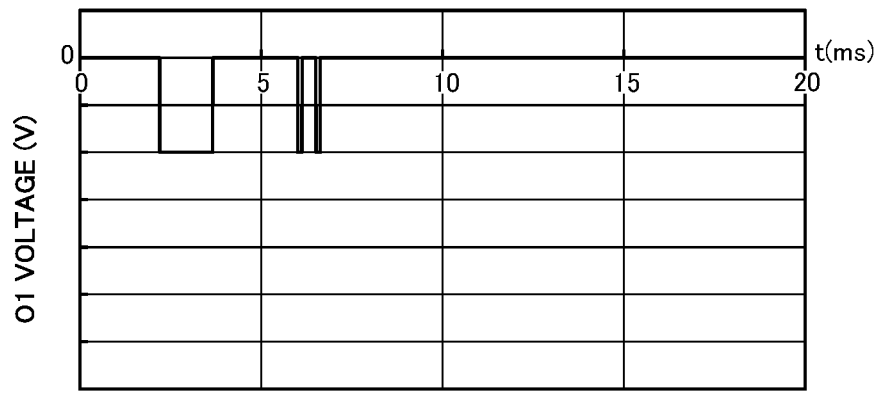
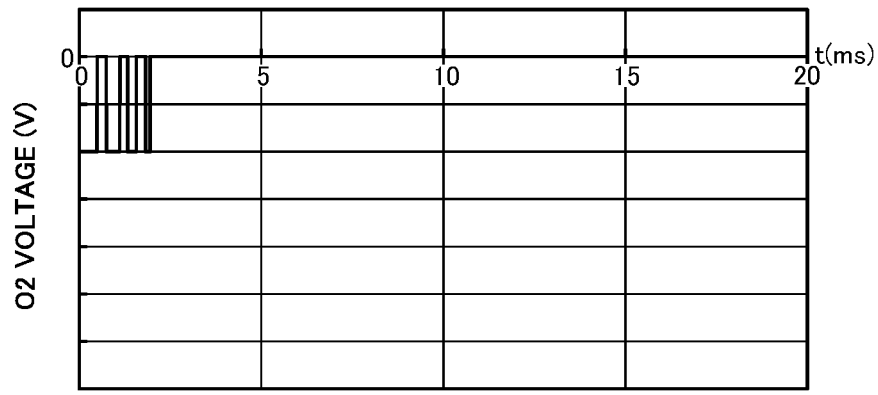

FIG.27
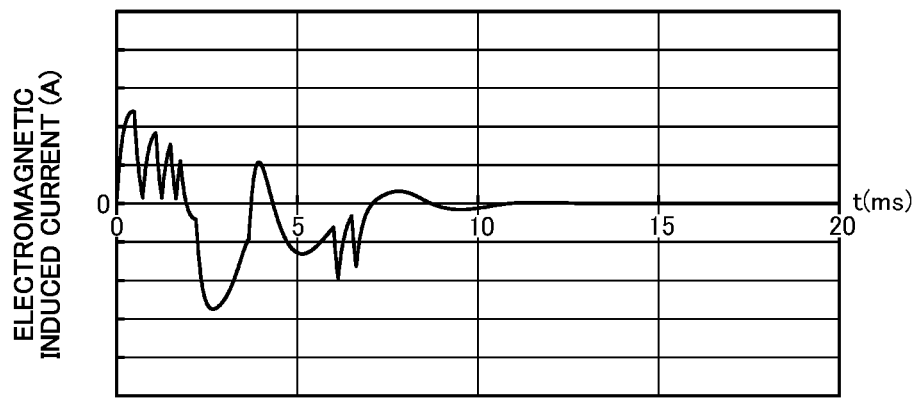
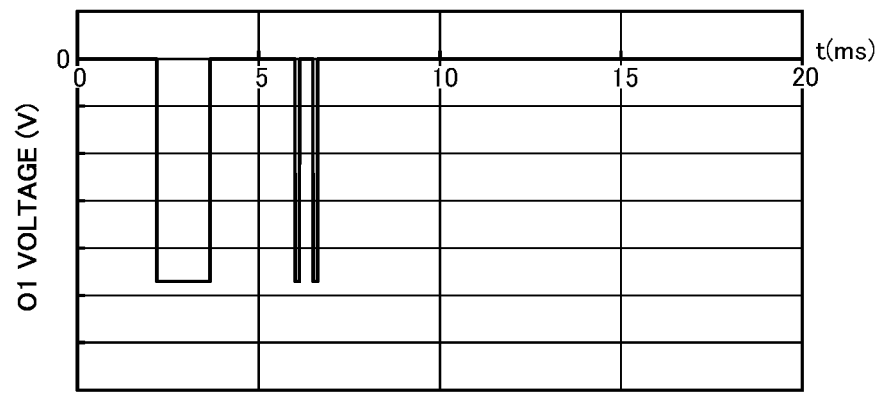
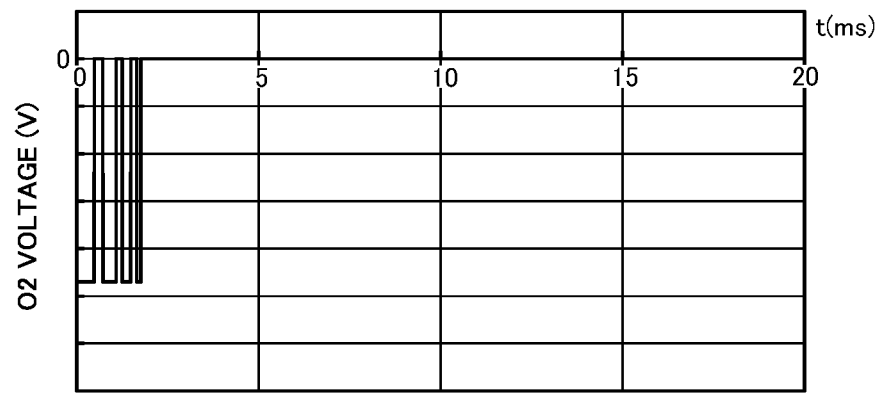

STEP MOTOR DRIVE DEVICE

CROSS REFERENCE TO RELATED APPLICATIONS

This application is a National Stage of International Application No. PCT/JP2020/032215 filed on Aug. 26, 2020, which claims priority from Japanese Patent Application 2019-174191, filed on Sep. 25, 2019. The contents of the above document is incorporated herein by reference in its entirety.

TECHNICAL FIELD

The present invention relates to a step motor drive device.

BACKGROUND ART

For example, an electronic timepiece with an analogue display means is equipped with a step motor that rotates half a turn to drive hands. The control device of the step motor measures an electromagnetic induced current generated in a coil after a drive signal for rotating the rotor is output and changes the pattern of the motor control in response to the measured electromagnetic induced current. The drive signal is composed of a single pulse or multiple pulses of certain polarity. With this configuration, the step motor is properly driven according to the situation.

In order to reduce power consumption, there has been a control method that measures an electromagnetic induced current after a partial pulse is output, and repeats outputting a next partial pulse when the electromagnetic induced current is smaller than a predetermined value.

Patent Literature 1 discloses that a coil is short-circuited when a current value above the upper limit is detected after a period T1 for applying a substantially constant voltage and is re-excited when the lower limit is reached, and the current value is determined to have advanced one step and the excitation is stopped when the period in which the current value reaches the lower limit from the upper limit exceeds the threshold value.

Patent Literatures 2 and 3 disclose saving power by repeating applying the simplex pulse and then outputting the next simplex pulse to the coil when the value of current flowing through the coil of the motor drops to the reference value Iref until a predetermined time has elapsed.

CITATION LIST

Patent Literature

Patent Literature 1: JPH02-33108B2
Patent Literature 2: JP2739259B2
Patent Literature 3: JP2913307B2

SUMMARY OF INVENTION

Technical Problem

However, if a disturbance such as a large change in battery voltage is applied, abnormal operation may be caused in which the rotation stops for some period of time or the rotation in the opposite direction to the original rotation direction occurs.

One or more embodiments of the present invention have been conceived in view of the above, and an object thereof is to provide a step motor drive device capable of stably rotating when an external disturbance is applied.

Solution to Problem

In order to solve the above described problems, the step motor drive device according to the present invention employs configurations described below.

(1) A step motor drive device includes a step motor including a rotor magnetized into two or more poles, a stator that transmits a magnetic force to the rotor, and a coil that generates a magnetic force to the stator, a drive circuit that outputs a drive signal including a plurality of partial signals that are output intermittently, a detecting circuit that detects an electromagnetic induced current that is generated in the coil after the partial signals are output, and a control unit that controls the drive circuit. The drive circuit outputs one of the partial signals included in the drive signal to the coil, and, in response to a change in an electromagnetic induced current generated in the coil after the partial signal is output, outputs a next partial signal to the coil. The control unit controls an output of the drive circuit to the step motor based on a signal interval of the plurality of partial signals.

(2) In (1), in the step motor drive device, if the partial signal is output and then an electromagnetic induced current smaller than a threshold value is detected, the drive circuit outputs a next partial signal to the coil.

(3) In (2), in the step motor drive device, the threshold value is greater than 0.

(4) In (2) or (3), in the step motor drive device, the control unit determines whether the rotor rotates by one step based on whether a signal interval, which is between an output of one of the plurality of partial signals to the coil and an output of a next partial signal, exceeds a determination threshold value and, if it is determined that the rotor rotates by one step, prevents the next partial signal from being output and terminates the output of the drive signal.

(5) In (4), the step motor further includes a response detection pulse outputting unit that outputs one or more response detection pulses in order after the partial signal is output, wherein if an electromagnetic induced current that is generated in the coil during a period in which the response detection pulses are output is smaller than the threshold value, the drive circuit outputs a next partial signal to the coil, and the control unit determines whether the rotor rotates by one step based on whether a number of the response detection pulses, which are output after one of the plurality of partial signals is output to the coil, exceeds the determination threshold value.

(6) In (5), in the step motor drive device, the control unit changes intensity of a drive signal to be output next based on the number of partial signals that are output until the output of the drive signal is terminated.

(7) In (5) or (6), in the step motor drive device, in response to the number of the partial signals that are output, the drive circuit changes the threshold value or an interval for detecting an electromagnetic induced current smaller than the threshold value.

(8) In any one of (1) to (3), in the step motor drive device, the control unit determines whether a phase of the rotor is a desired phase based on the signal interval of the plurality of partial signals, and if the phase is the desired phase, the control unit controls the drive circuit by a first drive method in which the drive circuit outputs a subsequent drive signal for rotating the rotor by one step in an opposite direction, and if the phase is not the desired phase, the control unit controls the drive circuit by a second drive method different from the first drive method so as to restrict the rotation of the rotor.

(9) In (8), in the step motor drive device, the drive signal is output during a predetermined output period, and the control unit determines whether the phase of the rotor is the desired phase based on a number of the partial signals that are output during the output period.

(10) In (8), in the step motor drive device, the control unit determines whether the phase of the rotor is the desired phase based on a time at which a predetermined number of the partial signals are output.

(11) In (8), the step motor drive device further includes a response detection pulse outputting unit that outputs one or more response detection pulses in order after the partial signal is output. If an electromagnetic induced current that is generated in the coil during a period in which the response detection pulses are output is smaller than a threshold value, the drive circuit outputs a next partial signal to the coil. The control unit determines whether the phase of the rotor is the desired phase based on a number of the response detection pulses that are output.

(12) In any one of (8) to (11), in the step motor drive device, a first partial signal of the plurality of partial signals is longer than other partial signals.

(13) In any one of (8) to (11), in the step motor drive device, the control unit increases the threshold value each time the partial signal is output.

(14) In any one of (8) to (10), the step motor drive device further includes a response detection pulse outputting unit that outputs one or more response detection pulses in order after the partial signal is output. The detecting circuit detects whether an electromagnetic induced current that is generated in the coil during a period in which the response detection pulses are output is smaller than a threshold value. The response detection pulse outputting unit changes an interval or a width of the response detection pulse to be output in response to a number of the partial signal that is output immediately before.

(15) In any one of (8) to (11), in the step motor drive device, if the determined phase is not the desired phase, the control unit controls the drive circuit to output a preparatory drive signal for rotating the rotor by one step in the opposite direction when the rotor is a same phase.

(16) In any one of (8) to (11), in the step motor drive device, if the determined phase is not the desired phase, the control unit controls the drive circuit to output a preparatory drive signal to a terminal, which is not a terminal to which the subsequent drive signal is output, of two terminals of the coil.

(17) In (15) or (16), in the step motor drive device, the preparatory drive signal generates a smaller driving force in the rotor than the subsequent drive signal.

(18) In any one of (8) to (11), in the step motor drive device, if the determined phase is not the desired phase, the control unit controls the drive circuit not to output a signal for driving the rotor to the coil.

(19) In any one of (1) to (18), the step motor drive device further includes a rotation detection pulse outputting unit that outputs a plurality of rotation detection pulses in order after the drive signal is output. The control unit determines whether the rotor rotates by one step based on an electromagnetic induced current that is generated in the coil during a period in which the rotation detection pulses are output. An interval at which the response detection pulses are output is smaller than an interval at which the rotation detection pulses are output.

(20) A step motor drive device includes a step motor including a rotor magnetized into two or more poles, a stator that transmits a magnetic force to the rotor, and a coil that generates a magnetic force to the stator, a drive circuit that outputs, to the coil, a series of drive signals for rotating the rotor in an opposite direction, and a control unit that controls the drive circuit. The control unit detects whether the rotor rotates by one step in the opposite direction after the drive signal is output. The drive circuit outputs, to the coil, a first convergence signal for facilitating a forward rotation of the rotor if the rotation by one step in the opposite direction is detected, and outputs, to the coil, a second convergence signal for restricting the rotation of the rotor if the rotation in the opposite direction is not detected.

(21) In (20), in the step motor drive device, the drive circuit outputs, to one end of the coil, the first convergence signal for facilitating the forward rotation of the rotor if the rotation by one step in the opposite direction is detected, and outputs, to the other end of the coil, the second convergence signal for restricting the rotation of the rotor if the rotation in the opposite direction is not detected.

Effects of the Invention

According to the present invention, even if disturbances are applied, the step motor can be rotated more stably than in the prior art.

BRIEF DESCRIPTION OF THE DRAWINGS

FIG. 4 shows an example of waveform diagrams of the electromagnetic induced current and voltages of terminals O1 and O2 in a forward rotation;

FIG. 6 shows an example of waveform diagrams of the electromagnetic induced current and voltages of terminals O1 and O2 in a forward rotation;

FIG. 21 shows an example of waveform diagrams of the electromagnetic induced current and the voltages at the terminals O1 and O2;

FIG. 23 shows an example of waveform diagrams of the electromagnetic induced current and the voltages at the terminals O1 and O2;

FIG. 25 shows an example of waveform diagrams of the electromagnetic induced current and the voltages at the terminals O1 and O2;

FIG. 27 shows an example of waveform diagrams of the electromagnetic induced current and the voltages at the terminals O1 and O2;

DESCRIPTION OF EMBODIMENTS

Embodiments of the present invention will be described in detail below, together with the drawings. In the following, a case will be described in which the present invention is applied to a portable electronic timepiece 1.

First Embodiment

Figure 1:
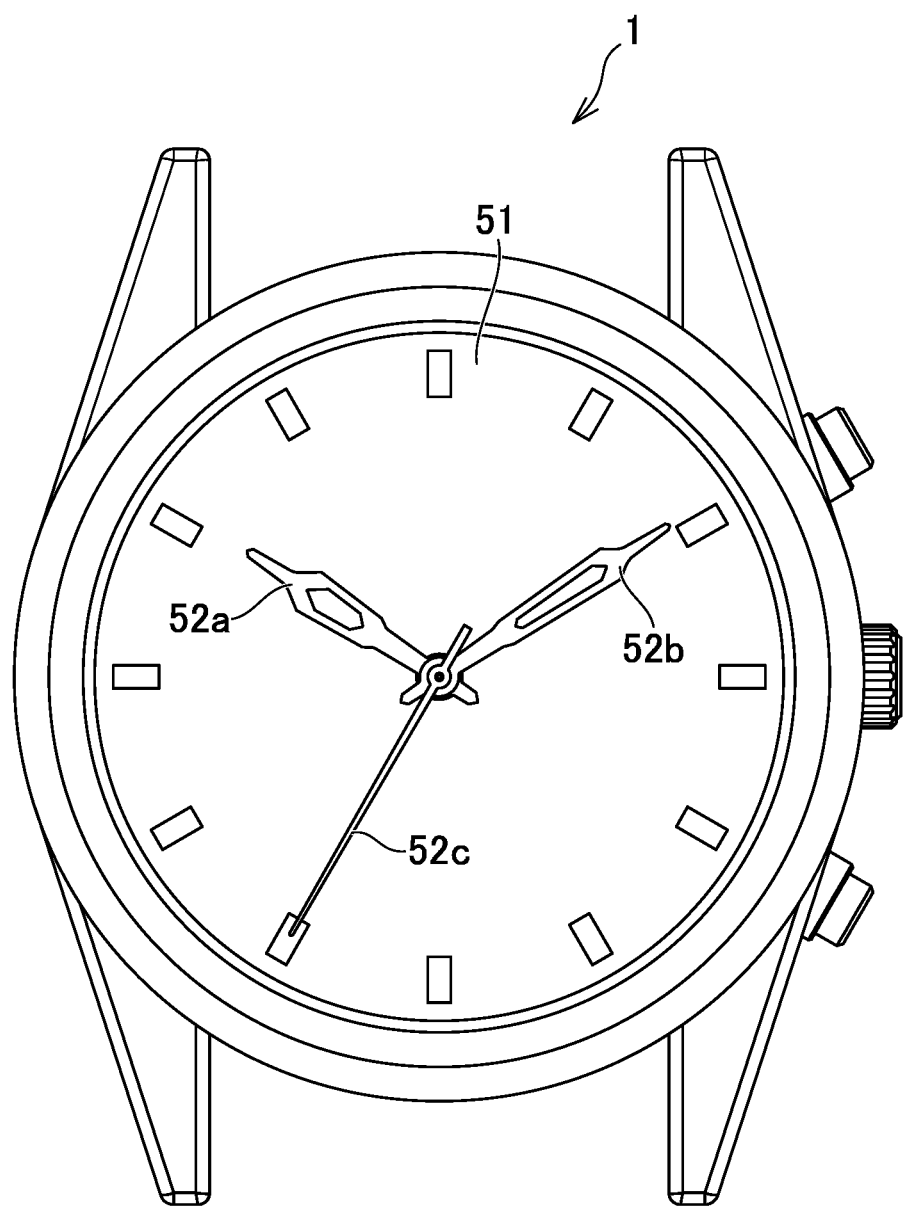
FIG. 1 is a plan view showing an example of an electronic timepiece according to a first embodiment.
Figure 2:
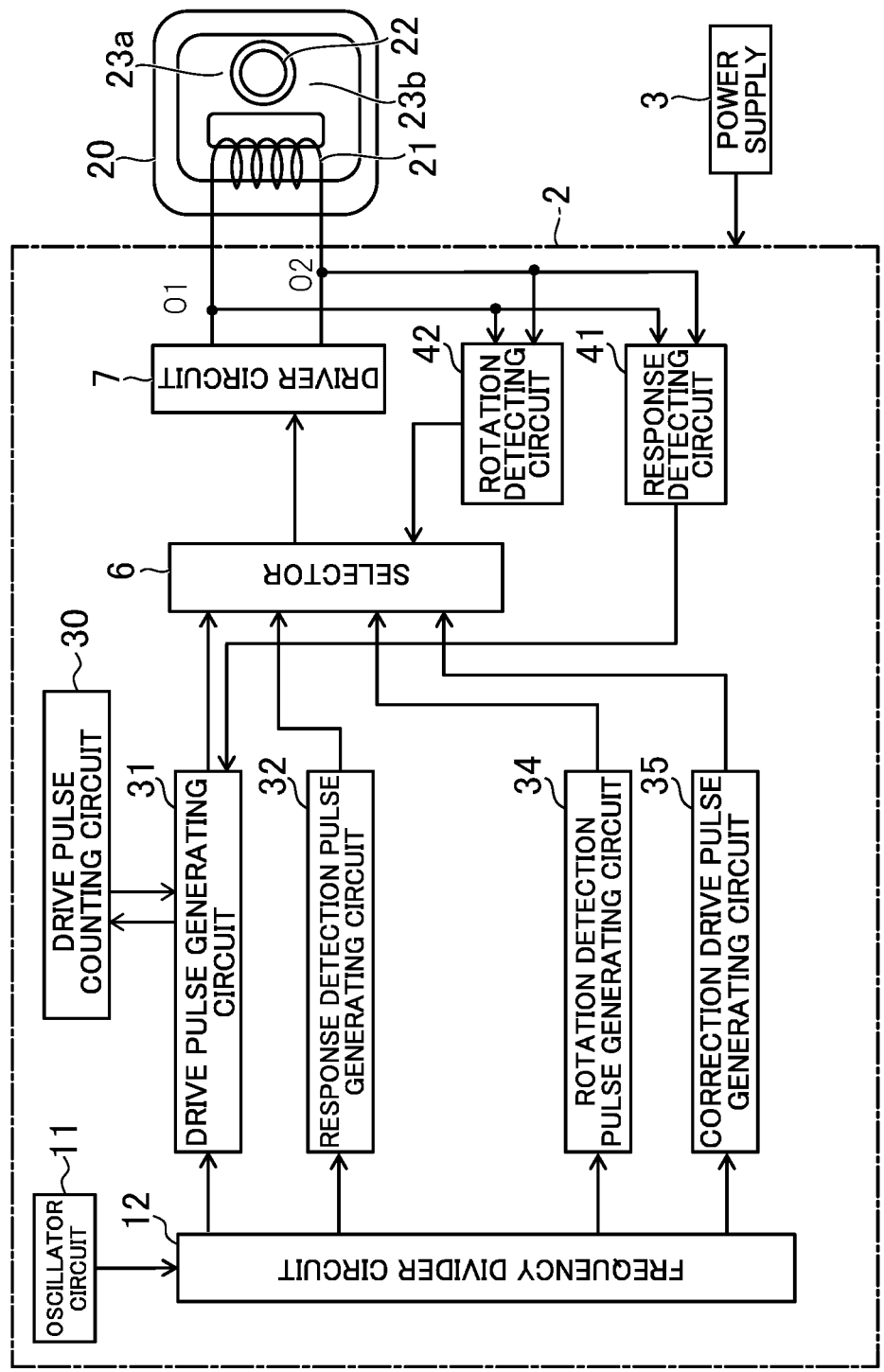
FIG. 2 is a block diagram showing an example of a circuit configuration of the electronic timepiece according to a first embodiment.

The first embodiment describes the electronic timepiece 1 in which the present invention is applied to control a forward rotation of a step motor 20. FIG. 1 is a plan view of an example of the electronic timepiece 1 according to the first embodiment, and FIG. 2 is a diagram schematically showing the circuit configuration of the electronic timepiece 1. The electronic timepiece 1 is an electronic timepiece with the analog display system. The electronic timepiece 1 includes a dial 51, an hour hand 52a, a minute hand 52b, a second hand 52c, a motor control unit 2, a power supply 3, a step motor 20, and a gear train (not shown). The power supply 3 includes, for example, a secondary battery.

The step motor 20 includes a coil 21, a rotor 22, and stators 23a and 23b. Two poles of an N pole and an S pole are magnetized in the rotor 22. More poles may be magnetized in the rotor 22. The stators 23a and 23b are opposed to each other across the rotor 22. The coil 21 generates a magnetic force corresponding to the current flowing. The magnetic forces generated at one end and the other end of the coil 21 are respectively transmitted to the stators 23a and 23b. The step motor 20 is mechanically connected to the gear train, and the hands such as the hour hand 52a, the minute hand 52b, and the second hand 52c are driven through the gear train.

The motor control unit 2 in FIG. 2 shows a configuration that is mainly required for rotating the step motor forward. The motor control unit 2 includes an oscillator circuit 11, a frequency divider circuit 12, a drive pulse counting circuit 30, a drive pulse generating circuit 31, a response detection pulse generating circuit 32, a rotation detection pulse generating circuit 34, a correction drive pulse generating circuit 35, a selector 6, a driver circuit 7, a response detecting circuit 41, and a rotation detecting circuit 42. The motor control unit 2 is implemented as an integrated circuit including a microcontroller, for example.

The oscillator circuit 11 outputs a predetermined clock signal by a quartz oscillator (not shown). The clock signal is fed into the frequency divider circuit 12. The frequency divider circuit 12 divides the frequency of the clock signal, and the clock signal divided by the frequency divider circuit 12 is fed into the drive pulse generating circuit 31, the response detection pulse generating circuit 32, the rotation detection pulse generating circuit 34, and the correction drive pulse generating circuit 35.

The drive pulse generating circuit 31 generates and outputs a plurality of partial drive pulses i, which are output intermittently, to produce a magnetic field of a predetermined polarity in the coil 21. The drive pulse counting circuit 30 counts the number of times the partial drive pulse i is output in the drive in one step. The response detection pulse generating circuit 32 generates and outputs a response detection pulse Si for detecting an electromagnetic induced current generated in the coil 21 by the movement of the rotor 22 during the period from the output of the partial drive pulse i to the output of the next partial drive pulse i or after the last partial drive pulse i is output.

The rotation detection pulse generating circuit 34 generates and outputs rotation detection pulses Ska and Skb for determining whether the rotor 22 has rotated by one step. If it is not determined that the rotor 22 has rotated by one step, the correction drive pulse generating circuit 35 generates and outputs a correction pulse for forcibly rotating the rotor 22.

The partial drive pulse i, the response detection pulse Si, the rotation detection pulses Ska and Skb, and the correction pulse are fed into the selector 6. The selector 6 then outputs any one of these pulses to the driver circuit 7 based on the control of the logic circuit and the microcontroller included in the motor control unit 2.

The driver circuit 7 supplies, to the terminals O1 and O2 of the coil 21 of the step motor 20, a partial drive signal Di corresponding to the partial drive pulse i entered from the selector 6 or a correction signal corresponding to the correction pulse, thereby driving the step motor 20. The timing of the rise and fall of the waveform of the signal output by the driver circuit 7 is substantially the same as the pulse fed into the driver circuit 7. The drive signal for rotating the rotor 22 by one step is configured of a series of a plurality of partial drive signals. The polarity of the partial drive signals included in a certain drive signal is the same. The driver circuit 7 is controlled by the motor control unit 2 to output the next partial drive signal to the coil 21 in response to a change in the electromagnetic induced force generated in the coil 21 after the partial drive signal is output.

When the response detection pulse Si is entered from the selector 6, the driver circuit 7 controls a switch provided between the coil 21 and the response detecting circuit 41 so as to input the electromagnetic induced current generated in the O1 terminal and the O2 terminal of the coil 21 to the response detecting circuit 41. Upon receiving the rotation detection pulses Ska and Skb from the selector 6, the driver circuit 7 controls a switch provided between the coil 21 and the rotation detecting circuit 42 so as to input the electromagnetic induced current generated in the O1 terminal and the O2 terminal of the coil 21 to the rotation detecting circuit 42.

The response detecting circuit 41 is a circuit for detecting the electromagnetic induced current generated in the coil 21 when the response detection pulse Si is fed into the driver circuit 7. The response detecting circuit 41 includes a comparator, for example, and detects whether the electromagnetic induced current exceeding the threshold value iVt, which is determined based on the detection resistor, is generated. The threshold value iVt is greater than 0.

The rotation detecting circuit 42 is a circuit for detecting the electromagnetic induced current generated in the coil 21 when the rotation detection pulses Ska and Skb are fed into the driver circuit 7. The rotation detecting circuit 42 includes a comparator, for example, and detects whether the electromagnetic induced current exceeding threshold values kaVt and kbVt, which are determined based on detection resistors, is generated. Further, the rotation detecting circuit 42 determines whether the rotor 22 has rotated to the next step based on the detected electromagnetic induced current. If it is determined that the rotor 22 is not rotated backward, the rotation detecting circuit 42 controls the selector 6 to input the correction pulse to the driver circuit 7.

Figure 3:
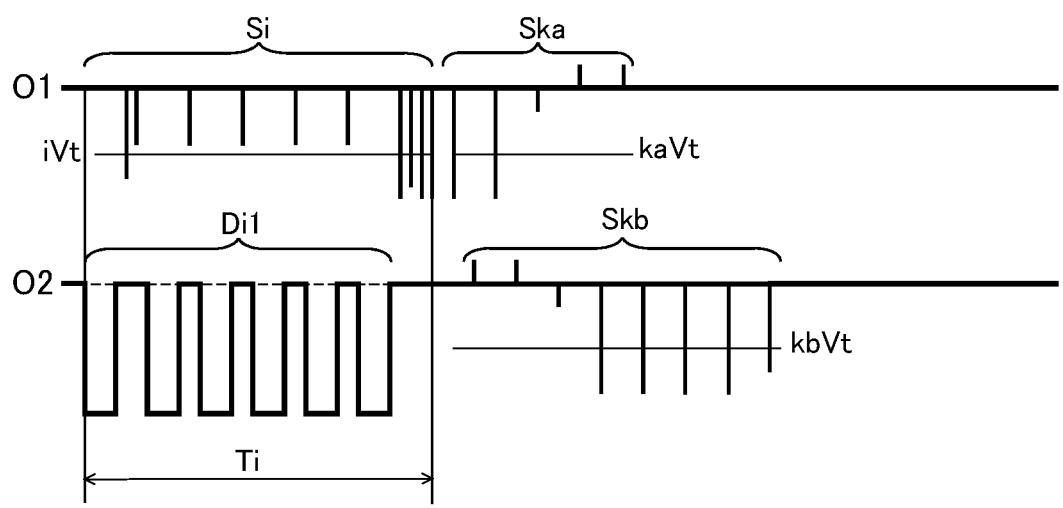
FIG. 3 is a waveform diagram showing an example of a signal that is output during the forward rotation in one step.

Next, the control for rotating the rotor 22 of the step motor 20 forward will be described. FIG. 3 is a waveform diagram showing an example of a signal that is output during the forward rotation in one step. FIG. 3 shows signals respectively applied to the terminals O1 and O2 and lines indicating the timing at which the response detection pulse Si and the rotation detecting pulses Ska and Skb are output. The lines indicating the timing extend in a direction intersecting with the time axis, and the lengths of the lines indicate values of the electromagnetic induced currents at the times. At each step, the waveform of the signal output from terminal O1 and the waveform of the signal output from terminal O2 are switched.

FIG. 4 shows an example of waveform diagrams of the electromagnetic induced current and the voltages at the terminals O1 and O2 in the forward rotation. The partial drive signal Di1 for the terminal O2 in FIG. 3 corresponds to the pulse described in the voltage of the terminal O2 in FIG. 4, and the lengths of the response detection pulse Si and the rotation detection pulses Ska and Skb in FIG. 3 correspond to values obtained by sampling the magnitude of the electromagnetic induced current in FIG. 4 at those timings. FIGS. 3 and 4 show examples of a case where the rotor 22 is normally rotated forward.

The drive period Ti corresponds to a period in which the drive signal is output, and a plurality of partial drive signals Di1 are output during the drive period Ti. Each partial drive signal Di1 generates a magnetic force in a direction repulsive to the magnetic pole of the rotor 22 to rotate the rotor 22 slightly in the forward direction. The output period of each pulse of the partial drive signal Di1 is 0.375 ms. Further, a partial drive signal Di2 has a longer output period of 0.5 ms. The drive pulse generating circuit 31 selectively outputs the partial drive pulse i1 and the partial drive pulse i2 depending on the condition of rotation, for example, and the driver circuit 7 thereby supplies one of the partial drive signal Di1 and the partial drive signal Di2 to the terminals O1 and O2.

The response detection pulse Si is output after the partial drive signal Di1 (or Di2) is output. The response detection pulse Si is repeatedly output until an electromagnetic induced current whose magnitude falls below the threshold value iVt is detected. The pulse widths of the response detection pulse Si and the rotation detection pulses Ska and Skb are 15.625 us. The interval (detection interval) between the detection of the response detection pulse Si and the output of the subsequent response detection pulse Si is 0.125 ms.

When the response detecting circuit 41 detects that the magnitude of the value of the electromagnetic induced current falls below the threshold value iVt and does not satisfy the end condition of the drive period Ti, the driver circuit 7 outputs the next partial drive signal Di1 (or Di2). The end condition of the drive period Ti is a condition for determining whether the rotor 22 has rotated by one step and the state in which the magnitude of the electromagnetic induced current detected by the response detection pulse Si does not fall below the threshold value iVt continues four times. When the end condition is satisfied, the next partial drive signal Di is not output, and the output of the drive signal is also terminated.

When the drive period Ti is completed, the rotation detection pulses Ska and Skb are output to the terminals O1 and O2. With the rotation detection pulses Ska and Skb, the rotation detecting circuit 42 more precisely determines whether the rotor 22 has rotated by one step. In the example of FIG. 3, the first rotation detection pulse Ska is output after 0.25 ms from the end of the drive period Ti, and the output interval of the subsequent rotation detection pulse Ska is 0.5 ms. The first rotation detection pulse Skb is output after 0.5 ms from the end of the drive period Ti, and the output interval of the subsequent rotation detection pulse is 0.5 ms. For example, when, with these rotation detection pulse Ska, the electromagnetic induced current greater than the threshold value kaVt is not detected four times or more, and then, with the rotation detection pulse Skb that is output, the electromagnetic induced current greater than the threshold value kbVt is detected three times or more, the rotation detecting circuit 42 determines that the rotor 22 has rotated by one step.

The detection interval of the response detection pulse Si that is output during the partial drive signal Di1 (or Di2) is less than the output interval of the rotation detection pulse Ska and Skb. When the detection interval by a response detection pulse Si is narrowed, the electromagnetic brake caused by such a response detection pulse Si is less likely to be applied, and thus the electromagnetic induced current becomes larger. This increases the detection sensitivity of the electromagnetic induced current. The determination based on the rotation detection pulse Ska and the rotation detection pulse Skb may be based on only one of them. The reliability of the rotation detection can be improved when the rotation is detected by both pulses.

Figure 5:
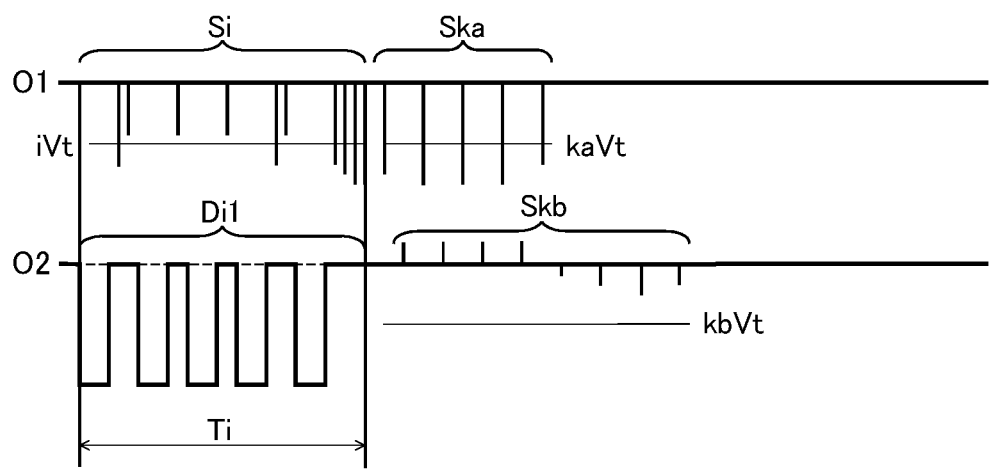
FIG. 5 is a waveform diagram showing another example of pulses that are output during the forward rotation.

FIG. 5 is a waveform diagram showing another example of pulses that are output during the forward rotation. FIG. 5 shows an example of a case where the battery voltage is temporarily reduced. FIG. 6 shows an example of waveform diagrams of the electromagnetic induced current and the voltages at the terminals O1 and O2 in the forward rotation. FIGS. 5 and 6 are examples of a case where the electromagnetic induced current detected by the response detection pulse Si satisfies the end condition of the drive period Ti but the rotor does not actually rotate. That is, while the partial drive signal Di should be output until the rotor can rotate, but it is erroneously determined that the rotor has rotated at an early stage by the response detection pulse Si and the drive period Ti is aborted earlier. In this case, the electromagnetic induced current detected by the rotation detection pulses Ska and Skb does not satisfy the condition of rotation, and thus it is determined that the rotor does not rotate. The detection sensitivity for determining whether the electromagnetic induced current falls below the threshold value iVt may be lowered (corresponding to lowering the threshold value iVt or expanding the detection interval. see second embodiment) by changing the detection resistor as the partial drive pulse i increases, for example. This reduces the possibility of erroneously determining that the rotor has rotated at an early stage.

In the examples of FIGS. 3 to 6, the output of the drive signal is terminated when the interval (signal interval) between the output of the partial drive signal Di1 (or Di2) and the output of the next partial drive signal Di1 (or Di2) exceeds a predetermined threshold value. More broadly, the motor control unit 2 changes the control method according to the signal interval. The period of outputting the drive signal (corresponding to the driving force) can be adjusted while outputting the drive signal, and thus the rotor can always rotate at a constant driving force. Further, the rotation determination by the rotation detection pulse Ska and the rotation detection pulse Skb is added after the end of the drive period Ti, and thus it is possible to reduce failure in rotation by one step due to fluctuations in power supply voltage, for example.

Figure 7:
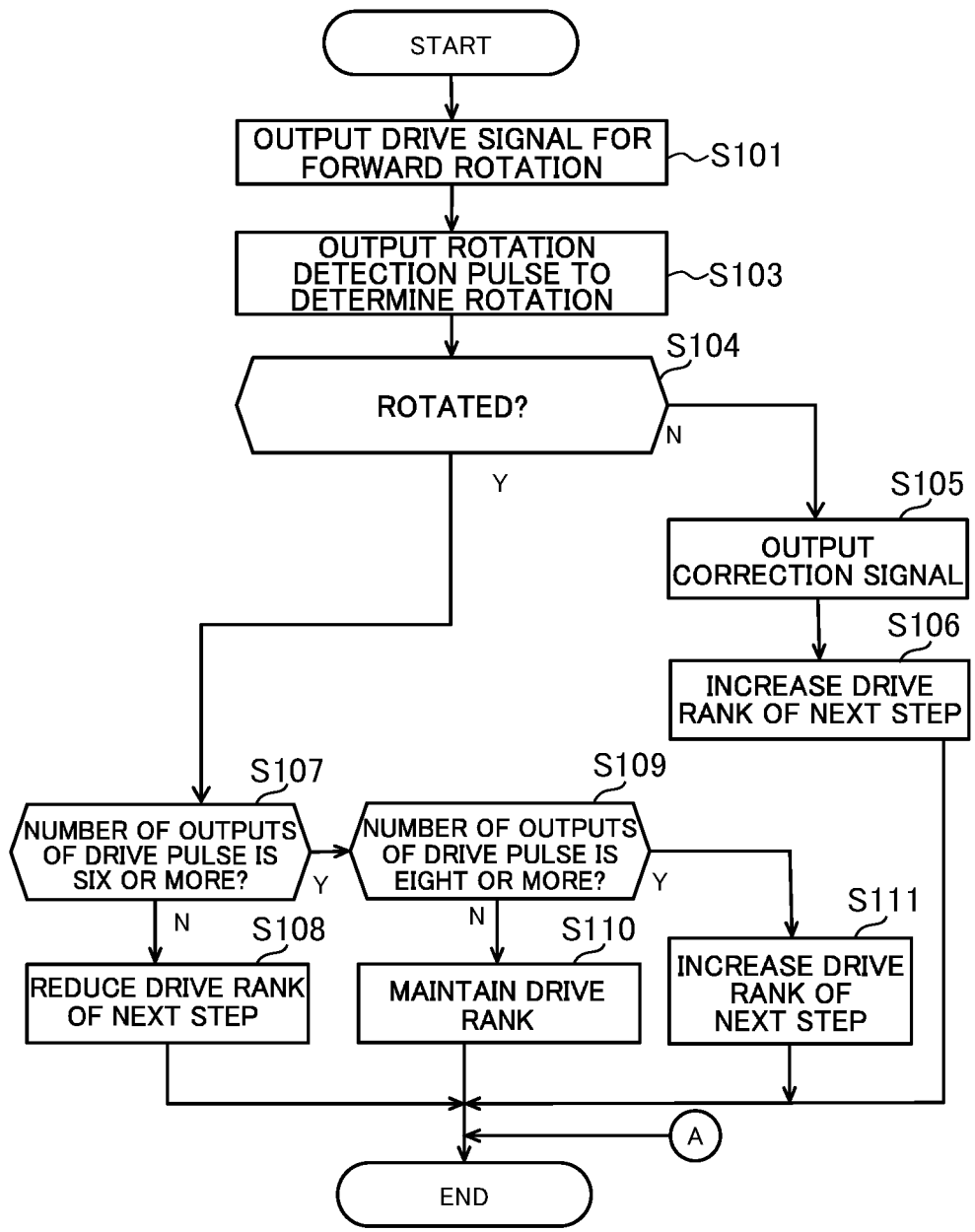
FIG. 7 is a flowchart showing an example of processing in the forward rotation.
Figure 8:
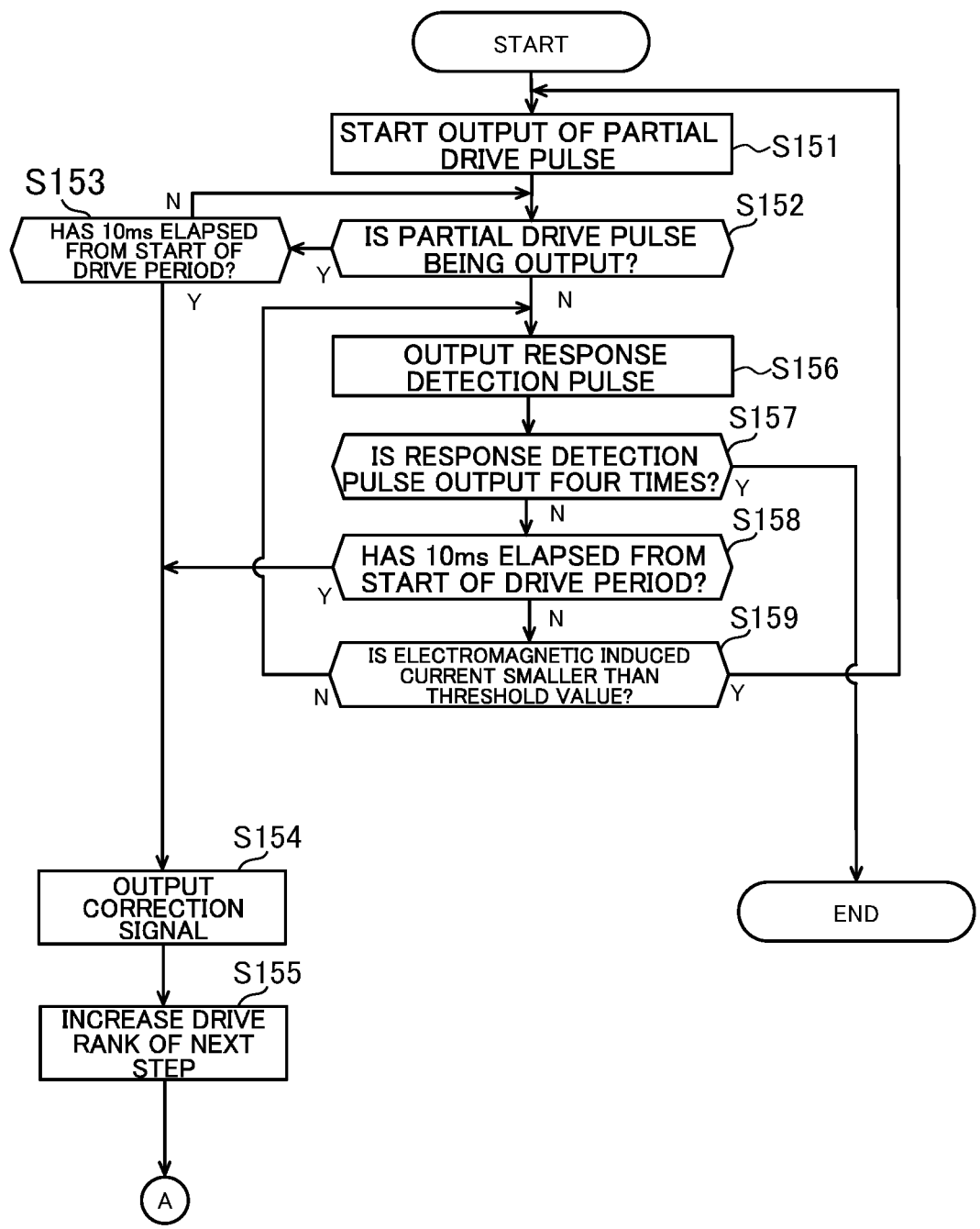
FIG. 8 is a flowchart showing an example of processing in the forward rotation.

Next, the control at the time of forward rotation will be further described. FIGS. 7 and 8 are flowcharts showing examples of processing in the forward rotation. FIG. 8 is a flowchart showing the processing of step S101 in FIG. 7. The processing shown in FIG. 7 is executed every time the rotor 22 is rotated one step forward. The processing shown in FIGS. 7 and 8 may be executed by the microcontroller included in the electronic timepiece 1 controlling the drive pulse generating circuit 31, the response detection pulse generating circuit 32, the rotation detection pulse generating circuit 34, the correction drive pulse generating circuit 35, the rotation detecting circuit 42, and the response detecting circuit 41.

First, the motor control unit 2 executes the following processing for outputting a drive signal (step S101) for the forward rotation. The count of the drive pulse counting circuit 30 is reset before the following processing.

The motor control unit 2 controls the drive pulse generating circuit 31 to start generating and outputting a partial drive pulse i (step S151). The driver circuit 7 into which the partial drive pulse i is fed outputs a partial drive signal Di1 or Di2 to the coil 21. At this time, the drive pulse counting circuit 30 counts the number of outputs of the partial drive pulse i (corresponding to the partial drive signal Di1 or Di2).

If the maximum drive period (10 ms in this case) has not elapsed from the start of the drive period Ti (N in step S153) while the partial drive pulses i are output (Y of the step S152), the motor control unit 2 repeats the processing from the step S152 onward until the output of the partial drive pulses i is completed. The maximum drive period prevents the output of the partial drive pulse i from increasing endlessly until the drive is possible.

When the maximum drive period has elapsed from the start of the drive period Ti (Y in step S153), it is assumed that the driving force is not enough to rotate the rotor 22, and thus the correction drive pulse generating circuit 35 generates a correction pulse and the driver circuit 7 in which the correction pulse is input via the selector 6 outputs a correction signal that forcibly rotates the rotor 22 (step S154). The correction signal includes a 5 ms signal and a subsequent 10 ms chopper signal. The chopper signal has a duty ratio of 16/32, and the period of the pulse included in the chopper signal is 0.25 ms. The correction signal is output after 32 ms from the start of the output of the partial drive signal Di. And the drive rank of the next step is increased so as to output the partial drive signal Di2 (step S155). The forward rotation by one step is then completed.

When the output of the partial drive pulse i is completed (N in step S152), the response detection pulse generating circuit 32 outputs a response detection pulse Si (step S156), and the response detecting circuit 41 detects whether the electromagnetic induced current in the response detection pulse Si is equal to or less than the threshold value iVt and determines whether the number of outputs of the response detection pulse Si is four (step S157). If the number of outputs of the response detection pulse Si is four (Y in step S157), the motor control unit 2 terminates the output of the drive signal and transitions to the processing after the step S103.

If the number of outputs of the response detection pulse Si is less than four (N in step S157), the motor control unit 2 determines whether the maximum drive period has elapsed from the start of the drive period Ti. When the maximum drive period has elapsed (Y in step S158), the processing of step S154 and subsequent steps is executed. It is determined whether the maximum drive period has elapsed from the start of the drive period Ti. If the maximum drive period has not elapsed (N in step S158), it is determined whether the electromagnetic induced current detected by the response detection pulse Si is smaller than the threshold value iVt (step S159). If the electromagnetic induced current is smaller than the threshold value iVt (Y in step S159), the processing of the step S151 onward is executed so as to output the next partial drive pulse i. If the electromagnetic induced current is equal to or greater than the threshold value iVt (N in step S159), the processing of the step S156 onward is executed to output the next response detection pulse Si. The number of outputs of the response detection pulse Si indicates the signal interval between the partial drive signals Di1 that are output before and after the response detection pulse Si. As such, the determination based on the number of outputs of the response-detecting pulse Si may also be performed based on the signal interval between the partial drive signals Di1.

When the drive period Ti is completed, the rotation detection pulse generating circuit 34 outputs rotation detection pulses Ska and Skb at a predetermined timing, and the rotation detecting circuit 42 determines whether the rotor 22 has rotated by one step in response to the electromagnetic induced force detected in accordance with the outputs (step S103). The determination conditions are as described with reference to FIGS. 3 and 4.

When it is determined that the rotor 22 has not rotated by one step (N in step S104), the correction drive pulse generating circuit 35 generates a correction drive pulse. The driver circuit 7 receives the correction drive pulse and outputs a correction signal to the coil 21, and the motor control unit 2 increases the drive rank of the next step. Increasing the driving rank is setting the driver circuit 7 to output a partial drive signal Di2 based on the output of the drive pulse generating circuit 31. When the drive rank is increased, the driving force of the step motor 20 by the drive signal is higher, and when the driving rank is lowered, the driving force of the step motor 20 by the drive signal is lower.

If it is determined that the rotor 22 has rotated by one step (Y in step S104), the motor control unit 2 determines the drive rank of the next step based on the number of partial drive pulses i that are output in the drive period Ti (the same as the number of partial drive signals Di). More specifically, if the number of outputs of the partial drive pulse i is less than six (N in step S107), the drive rank of the next step is lowered (the partial drive signal Di1 is set to output in the next step), and if the number of outputs of the partial drive pulse i is six or more and less than eight (N in step S108), the drive rank of the next step is maintained (of the partial drive signals Di1 and Di2, the same signal as now is set to be output). If the number of outputs of the partial drive pulse i is eight or more (Y in step S109), the drive rank of the next step is increased (the partial drive signal Di2 is set to be output in the next step). As the power supply voltage is lowered in this manner, the drive rank is increased in advance. As such, it is less likely that the rotation where the drive period Ti is terminated early as shown in FIGS. 5 and 6 occurs. Further, it is also less likely that the battery voltage rises and the excessive driving force causes the abnormal operation and prevents the rotation detection pulses Ska and Skb from following the electromagnetic induced current waveform.

Figure 9:
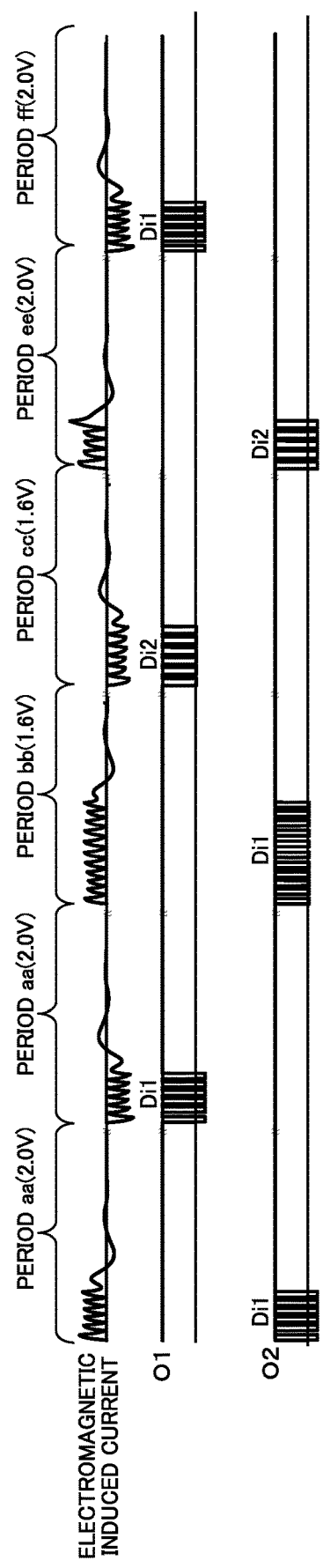
FIG. 9 is a diagram explaining a change of a drive rank.

FIG. 9 is a diagram explaining a change of the drive rank. Normal power supply voltage 2.0V is supplied to periods aa and bb. In the next period cc, the power supply voltage is lowered to 1.6V and the number of outputs of the partial drive signal Di1 becomes more than eight, and thus the drive rank is increased and the partial drive signal Di2 is output in the next period dd. In the period ee, the power supply voltage is returned to 2.0V and the number of outputs of the partial drive signal Di2 is less than six, and thus the drive rank is lowered and the partial drive signal Di1 is output in the next period ff. Not only the length of the drive period Ti is adjusted but also the partial drive signals Di1 and Di2 are switched, which serves to deal with a wider range of environmental changes and always rotate with the stable driving force. The partial drive signals Di1 and Di2 have been described as two types, although three or more types may of course be used. The driving force can be precisely switched according to the fluctuation of the power supply voltage. The switching of the drive rank is determined for each step, although after two or three steps of the rotation, for example, whether all of the steps match the switching condition of the predetermined drive rank is determined and the switching of the drive rank may be thereby determined. The driving force can be switched in a relatively stable state of the power supply voltage, and thus it is possible to reduce the possibility that the power consumption is increased or the rotation detection pulse cannot follow because the drive rank is erroneously switched due to the large fluctuation in the power supply voltage, such as when a radio wave is received by a radio-controlled watch, or power supply noise.

With the processing shown in FIGS. 7 and 8, the step motor 20 can be controlled more precisely in the method described in FIGS. 3 and 4. The drive rank is switched based on the number of outputs of the partial drive pulse i, although the drive rank may be switched based on the number of outputs of the response detection pulse Si, because as the number of outputs of the response detection pulse Si increases, the number of outputs of the partial drive pulse i also increases. An output period of each pulse of the partial drive signal Di1 and the partial drive signal Di2 are the same, although a width of a pulse may be increased as the number of partial drive signals is increased. If the width of the pulse is increased, the drive period Ti can be shortened to be effective for high-speed movement.

[Variation of First Embodiment]

In the following, the variation of the first embodiment will be described mainly focused on the difference from the first embodiment. In this variation, unlike the previous examples, a preceding partial signal Dj1 or Dj2 is output before the partial drive signal Di1 is output.

Figure 10:
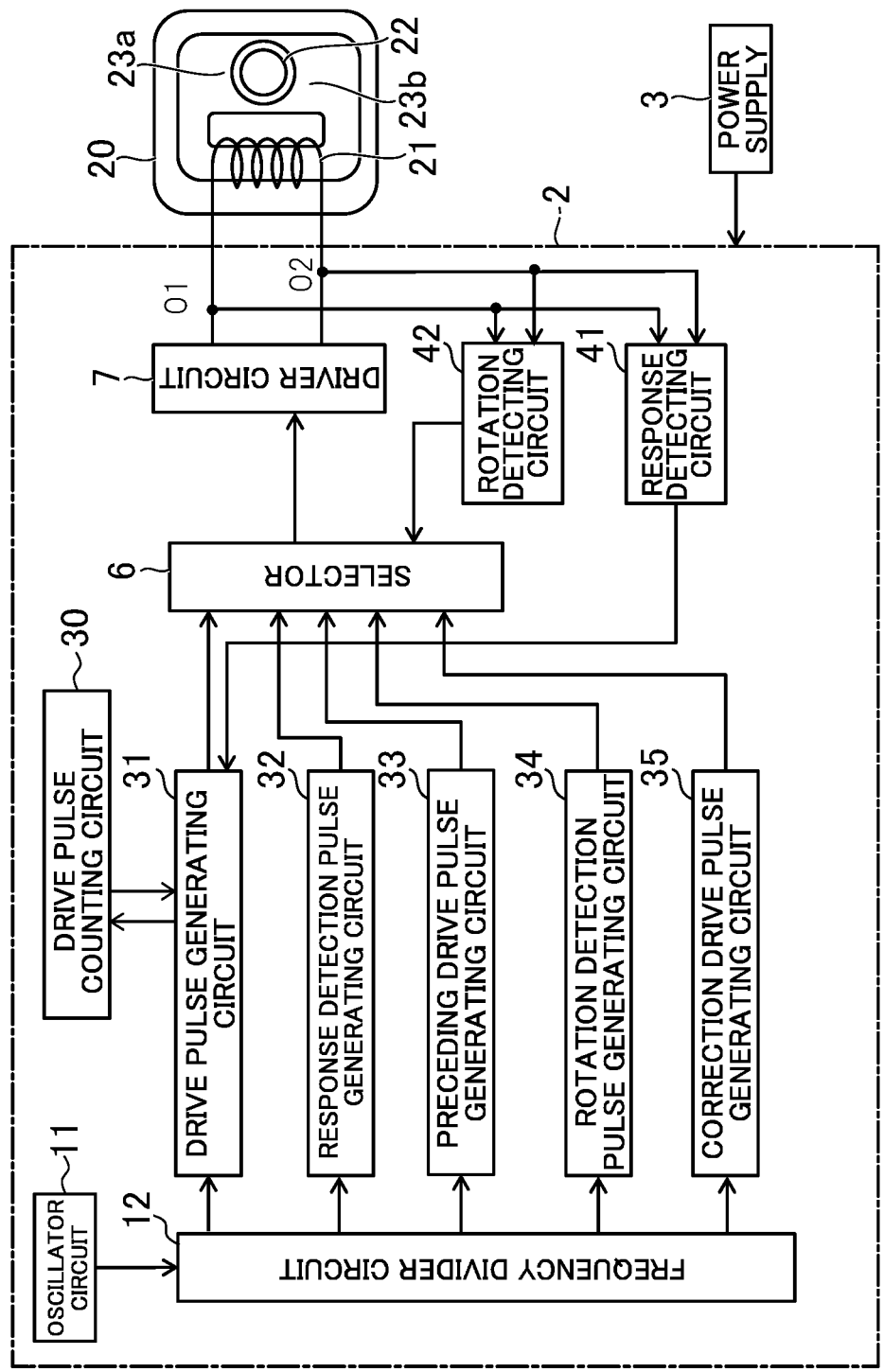
FIG. 10 is a block diagram showing a variation of the circuit configuration of the electronic timepiece.

FIG. 10 is a block diagram showing a variation of the circuit configuration of the electronic timepiece. In this variation, a preceding drive pulse generating circuit 33 is added to the example of FIG. 2, and the operations of the drive pulse generating circuit 31 and the response detecting circuit 41 are different from the example of FIG. 2.

Figure 11:
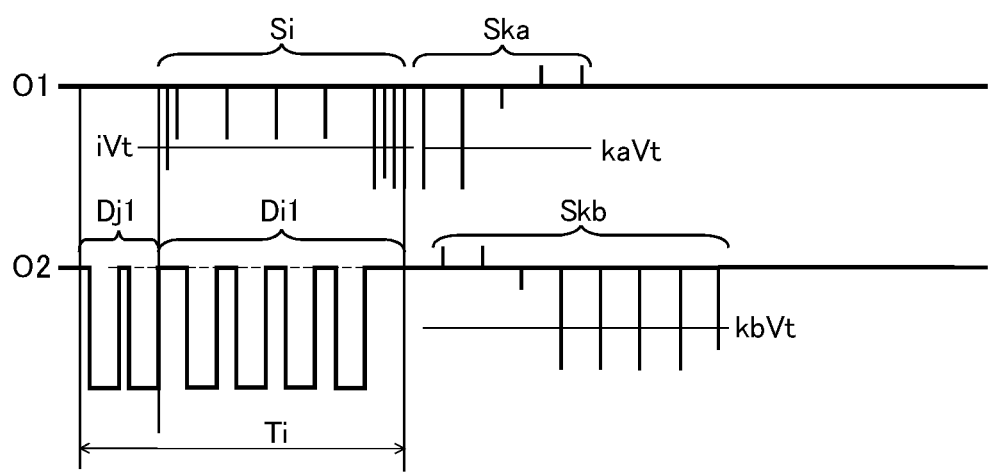
FIG. 11 is a waveform diagram showing an example of a signal that is output during the forward rotation in one step.
Figure 12:
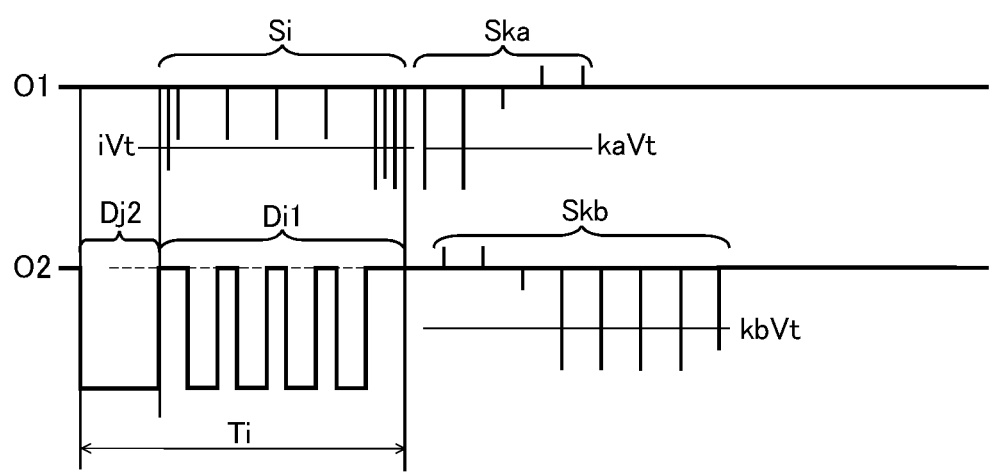
FIG. 12 is a waveform diagram showing another example of a signal that is output during the forward rotation in one step.

FIG. 11 is a waveform diagram showing an example of a signal that is output during the forward rotation. FIG. 12 is a waveform diagram showing another example of a signal that is output during the forward rotation in one step, and showing a signal that is output in the higher drive rank than the example of FIG. 11. FIGS. 11 and 12 correspond to FIG. 3, and show the signals respectively applied to the terminals O1 and O2 and lines indicating the timing at which the response detection pulse Si and the rotation detection pulse Sk are output.

In the example shown in FIGS. 11 and 12, in the drive period Ti in which the drive signal is output, one of the preceding partial signals Dj1 and Dj2 and a plurality of partial drive signals Di1 are output in order. The preceding partial signal Dj1 is two pulses of 0.375 ms width that are output every 0.5 ms when the drive rank is low. The preceding partial signal Dj2 is a pulse that is output for 1.0 ms when the drive rank is high.

In the examples of FIGS. 11 and 12, the response detection pulse Si is output immediately after the preceding partial signal Dj1 or Dj2 is output, and the electromagnetic induced current is detected. This is because the rotor 22 may rotate due to the preceding partial signal Dj1 or Dj2. In view of the rotation that may occur, as seen in FIG. 11, the preceding partial signal Dj1 has a chopper pulse configuration including a chopper off period and a subsequent drive pulse output period. This is because regardless of which of the two driving ranks of the preceding partial signal Dj1 and the preceding partial signal Dj2 is output, the start timing of output of the response detection pulses Si is set to be the same. That is, if the chopper pulse of the preceding partial signal Dj1 includes only the drive pulse output period and the subsequent chopper off period, the electromagnetic induced current due to the rotor rotation is generated immediately after the preceding partial signal Dj1 is output, and thus it is necessary to advance the start time of output of the response detection pulse Si so as to detect the electromagnetic induced current. In this case, the start time of output of the response detection pulse Si needs to be different between the preceding partial signal Dj1 and the preceding partial signal Dj2.

The end condition of the drive period Ti is that four response detection pulses Si are output, which is the same as shown in FIGS. 3 and 4. If it is detected that the electromagnetic induced current is lower than the threshold value iVt by the response detection pulse Si after the preceding partial signal Dj1 or Dj2, the partial drive signal Di1 is then output, and the subsequent operation is the same as the example in FIGS. 3 and 4.

Figure 31:
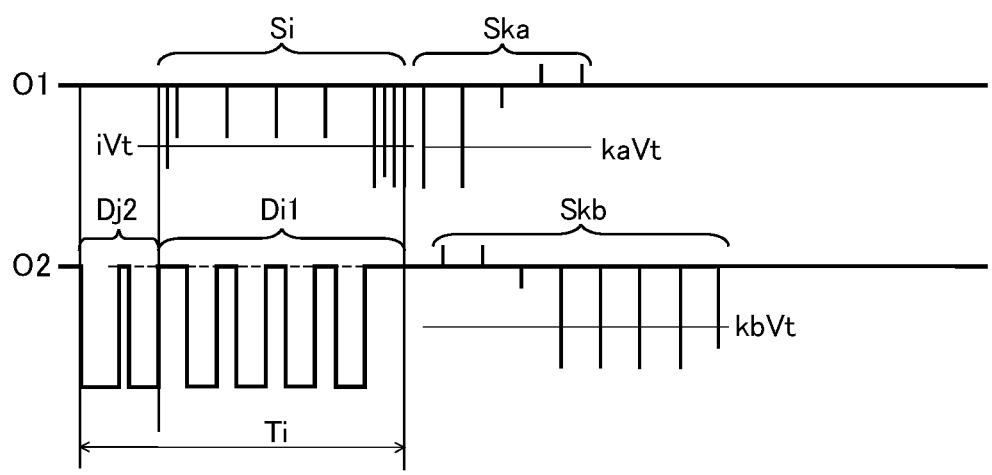
FIG. 31 is a waveform diagram showing another example of a signal that is output during the forward rotation in one step.

The preceding partial signals Dj1 and Dj2 may be different from those in FIGS. 11 and 12. It is sufficient that the period in which the pulse of the preceding partial signal Dj2 is applied is longer than that of the preceding partial signal Dj1. For example, as shown in FIG. 31, when the drive rank is switched, not all the pulses of the preceding partial signal Dj are switched, but some of the pulses may be switched. In the example of FIG. 31, the precedent partial signal Dj2 includes a 0.5 ms wide pulse followed by a 0.375 ms wide pulse. An example of using two types of partial drive signals Dj1 and Dj2 has been described here, although three or more types may of course be used. For example, if there are three drive ranks, the partial drive signal may include, in descending order of the drive rank, two pulses having a width of 0.25 ms, two pulses having a width of 0.375 ms, or two pulses having a width of 0.5 ms, which is output every 0.5 ms respectively. Instead of determining whether to switch the drive rank at each step, it is also possible to determine whether to switch the drive rank after two or three steps of rotations, for example.

Figure 13:
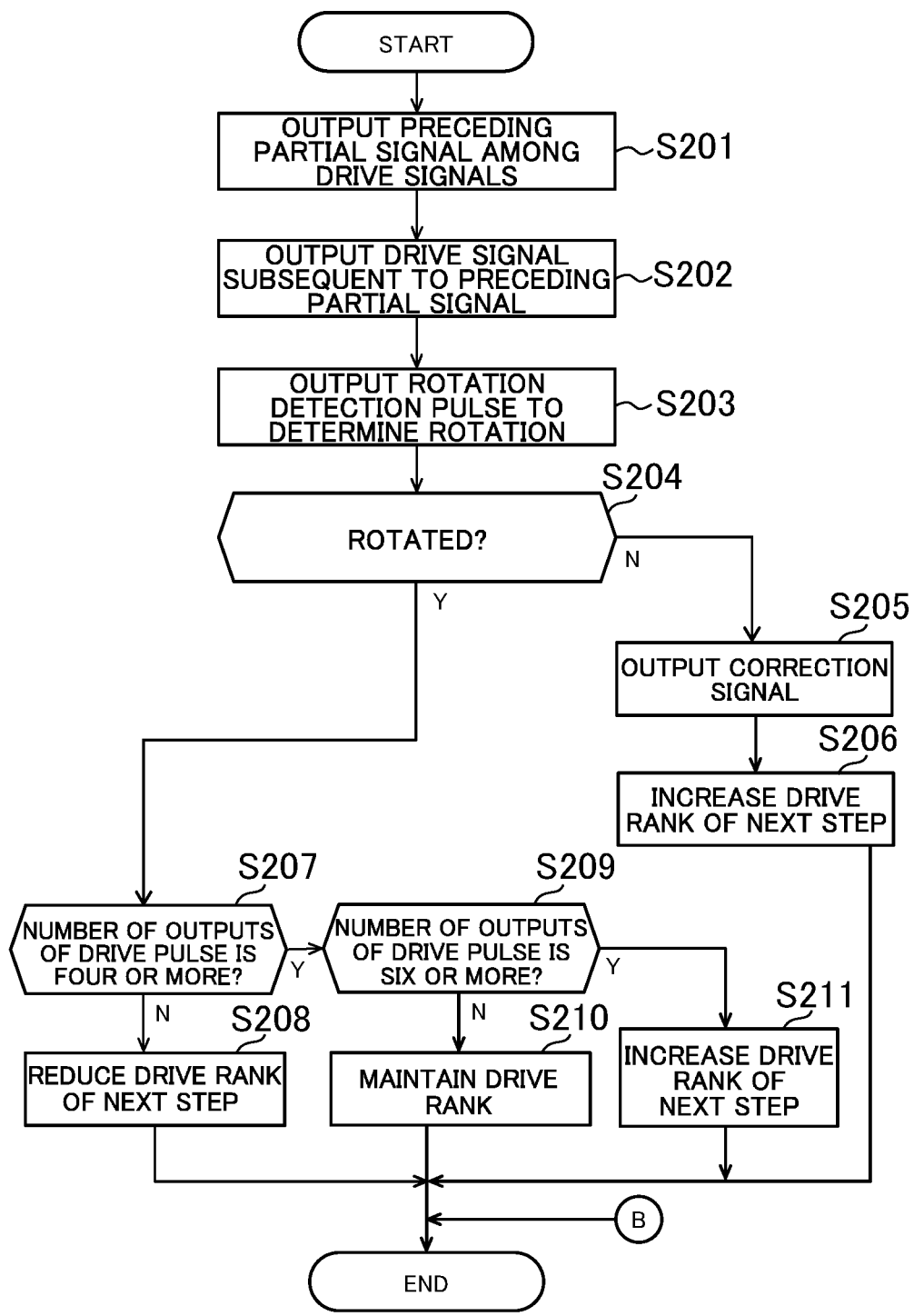
FIG. 13 is a flowchart showing another example of processing in the forward rotation.
Figure 14:
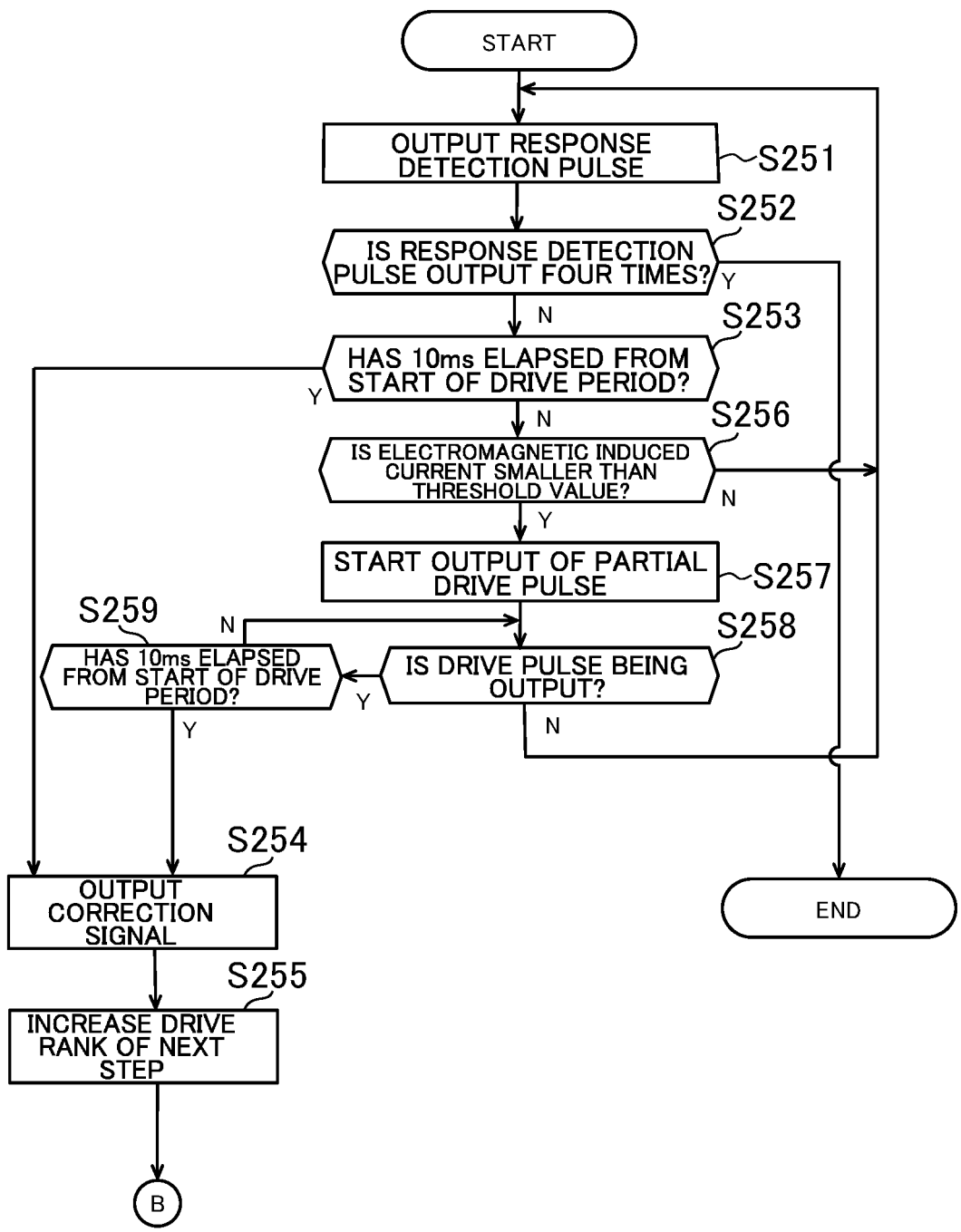
FIG. 14 is a flowchart showing another example of processing in the forward rotation.

Next, the control at the time of the forward rotation will be further described. FIGS. 13 and 14 are flowcharts showing another example of the processing in the forward rotation and correspond to FIGS. 7 and 8. In the following, the descriptions of common points with FIGS. 7 and 8 will be omitted. The processing shown in FIGS. 13 and 14 are executed by the microcontroller included in the motor control unit 2 controlling the drive pulse generating circuit 31, the response detection pulse generating circuit 32, the preceding drive pulse generating circuit 33, the rotation detection pulse generating circuit 34, the correction drive pulse generating circuit 35, the rotation detecting circuit 42, and the response detecting circuit 41.

First, the motor control unit 2 outputs the preceding partial signal Dj1 or Dj2 among the drive signals for the forward rotation (step S201). The processing shown in FIG. 14 is then executed so as to output a subsequent drive signal. FIG. 14 is a flowchart showing the processing of the step S202 in FIG. 13.

First, the response detection pulse generating circuit 32 outputs a response detection pulse Si (step S251), and the response detecting circuit 41 detects whether the electromagnetic induced current in the response detection pulse Si is equal to or less than the threshold value iVt and determines whether the number of outputs of the response detection pulse Si is four (step S252). If the number of outputs of the response detection pulse Si is four (Y in step S252), the motor control unit 2 terminates the output of the drive signal and transitions to the processing after the step S203.

If the number of outputs of the response detection pulse Si is less than four (N in step S252), the motor control unit 2 determines whether the maximum drive period (10 ms) has elapsed from the start of the drive period Ti (step S253). When the maximum drive period has elapsed (Y in step S253), the correction drive pulse generating circuit 35 generates a correction pulse and the driver circuit 7 in which the correction pulse is input via the selector 6 outputs a correction signal that forcibly rotates the rotor 22 (step S254). The drive rank of the next step is increased so as to output the preceding partial signal Dj2 (step S255). The forward rotation by one step is then completed.

On the other hand, if the maximum drive period has not elapsed (N in step S253), the motor control unit 2 determines whether the electromagnetic induced current detected by the response detection pulse Si is smaller than the threshold value iVt (step S256). If the electromagnetic induced current is smaller than the threshold value iVt (Y in step S256), the motor control unit 2 controls the drive pulse generating circuit 31 to start output of the partial drive pulse i (step S257). If the electromagnetic induced current is equal to or greater than the threshold value iVt (N in step S253), the processing of the step S251 onward is executed to output the next response detection pulse Si.

While the partial drive pulse i is output (Y in step S258), the motor control unit 2 waits with repeating the processing in step S258 until the output of the partial drive pulse i is completed except when the maximum drive period has elapsed from the start of the drive period Ti (N in step S259).

When the maximum drive period has elapsed from the start of the drive period Ti (N in step S259), the processing in step S254 onward is executed.

When the drive period Ti is completed, the rotation detection pulse generating circuit 34 outputs rotation detection pulses Ska and Skb at a predetermined timing, and determines whether the rotor 22 has rotated by one step in response to the electromagnetic induced force detected in accordance with the outputs (step S203). The determination conditions are the same as described with reference to FIGS. 3 and 4.

If it is determined that the rotor 22 has not rotated by one step (N in step S204), the correction signal is output (step S205) and the motor control unit 2 increases the drive rank of the next step (step S206). In this case, the driver circuit 7 is set to output the preceding partial signal Dj2 based on the output of the preceding drive pulse generating circuit 33.

If it is determined that the rotor 22 has rotated by one step (Y in step S204), the motor control unit 2 determines the drive rank of the next step. More specifically, if the number of outputs of the partial drive pulse i is less than four (N in step S207), the drive rank of the next step is increased (set the preceding partial signal Dj2 to be output in the next step), and if the number of outputs of the partial drive pulse i is four or more and less than six (N in step S208), the drive rank of the next step is maintained (of the preceding partial signals Dj1 and Dj2, the same signal as now is set to be output). If the number of outputs of the partial drive pulse i is six or more (Y in step S209), the drive rank of the next step is lowered (set the preceding partial signal Dj1 to be output in the next step).

The processing shown in FIGS. 13 and 14 enables the signals to be output as shown in FIGS. 11 and 12. The first embodiment and its variation assume the case of one second per step, although it may be applied to high-speed movement, such as 64-Hz movement. When the condition for outputting a correction pulse is obtained, the speed may be temporarily reduced to 16 Hz, for example, so as to guarantee the output period of such a correction pulse. The shape of pulse and the number of pulses for determination are examples and should be set in accordance with the motor as appropriate.

Second Embodiment

Figure 15:
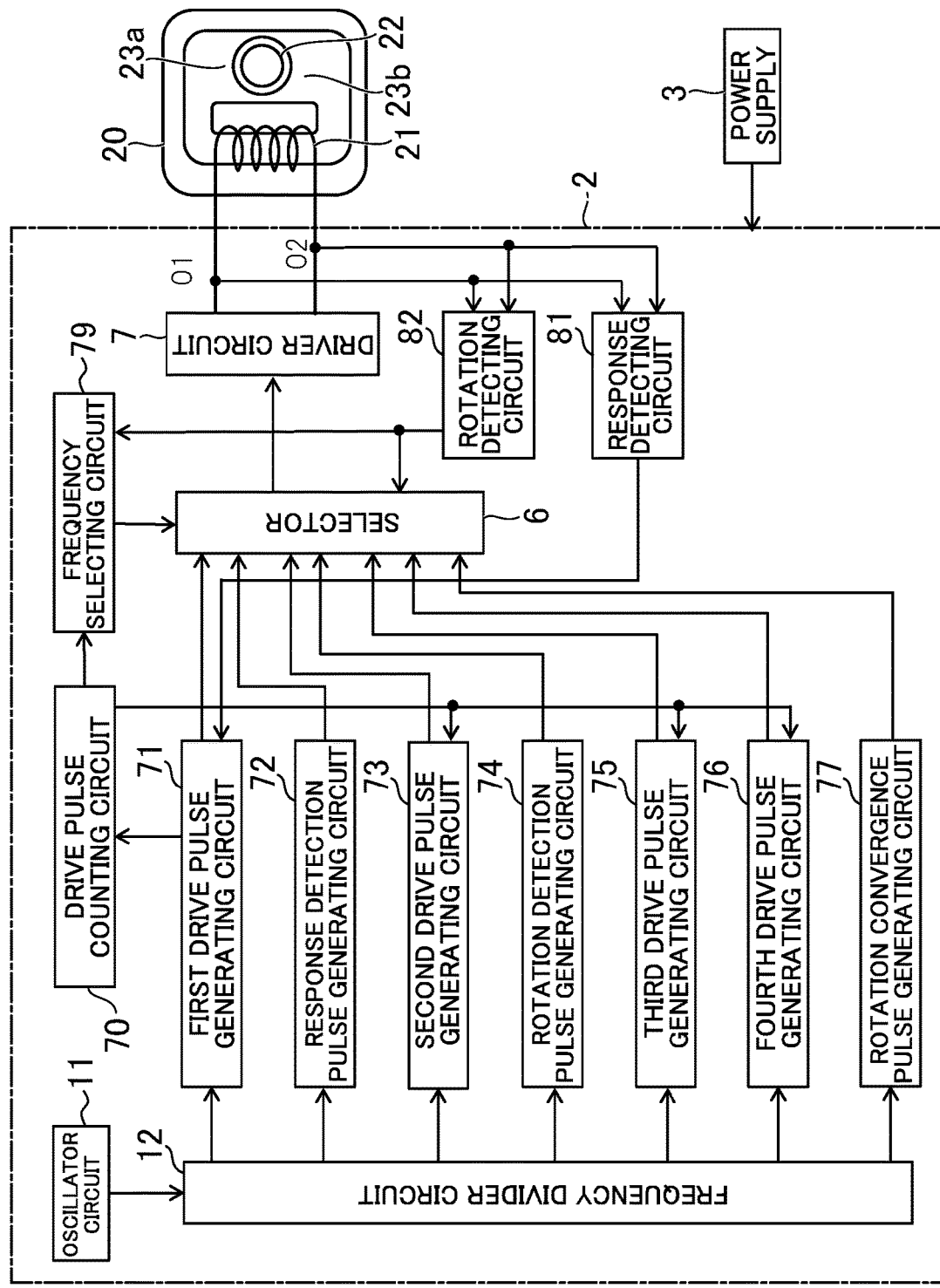
FIG. 15 is a block diagram showing an example of a circuit configuration of the electronic timepiece according to a second embodiment.

The second embodiment describes the electronic timepiece 1 in which the present invention is applied to control a reverse rotation of the step motor 20. FIG. 15 is a schematic diagram showing a circuit configuration of the electronic timepiece 1 according to the second embodiment. The external shape is the same as that of the first embodiment, and thus its description will be omitted.

The electronic timepiece 1 includes the hands and the like as shown in FIG. 1, a motor control unit 2, a power supply 3, a step motor 20, and a gear train (not shown). The power source 3, the step motor 20, the gear train, and the pointers shown in FIG. 1 are the same as those of the first embodiment, and thus the descriptions thereof will be omitted.

The motor control unit 2 in FIG. 15 shows a configuration that is mainly required for rotating the step motor backward. The motor control unit 2 includes an oscillator circuit 11, a frequency divider circuit 12, a drive pulse counting circuit 70, a first drive pulse generating circuit 71, a response detection pulse generating circuit 72, a second drive pulse generating circuit 73, a rotation detection pulse generating circuit 74, a third drive pulse generating circuit 75, a fourth drive pulse generating circuit 76, a rotation convergence pulse generating circuit 77, a selector 6, a driver circuit 7, a response detecting circuit 81, and a rotation detecting circuit 82. The motor control unit 2 is implemented as an integrated circuit including a microcontroller, for example.

The oscillator circuit 11 and the frequency divider circuit 12 are the same as those in the first embodiment. The clock signal divided by the frequency divider circuit 12 is fed into a first drive pulse generating circuit 71, a response detection pulse generating circuit 72, a second drive pulse generating circuit 73, a rotation detection pulse generating circuit 74, a third drive pulse generating circuit 75, a fourth drive pulse generating circuit 76, and a rotation convergence pulse generating circuit 77.

The first drive pulse generating circuit 71 generates and outputs a plurality of partial drive pulses m, which are output intermittently, to produce a magnetic field of a predetermined polarity in the coil 21. The response detection pulse generating circuit 72 generates and outputs a response detection pulse Sm for detecting an electromagnetic induced current generated by the movement of the rotor 22 during the period from the output of the partial drive pulse m to the output of the next partial drive pulse m or after the last partial drive pulse m is output. The drive pulse counting circuit 70 counts the number of times the partial drive pulse m is output in the drive in one step. The motor control unit 2 determines, based on the interval (signal interval) at which a series of partial drive pulses m are output, whether the phase of the rotor 22 and the phase estimated by the motor control unit 2 are the same. In the following, a case where the phases are the same is referred to as the same phase, and a case where the phases are opposite to each other is referred to as the opposite phase.

The second drive pulse generating circuit 73 generates and outputs a second drive pulse b when the phase assumed by the motor control unit 2 and the phase of the rotor 22 are the same. In response to the second drive pulse b, the driver circuit 7 outputs a second drive signal B to rotate the rotor 22 in the opposite direction. After the second drive pulse b is output, the rotation detection pulse generating circuit 74 generates and outputs a rotation detection pulse Sk for determining whether the rotor 22 has rotated in the opposite direction by one step.

The third drive pulse generating circuit 75 generates and outputs a third drive pulse c when the phase assumed by the motor control unit 2 and the phase of the rotor 22 are the opposite. The third drive pulse c is output as a plurality of pulses. The details of the third drive pulse c will be described later.

The fourth drive pulse generating circuit 76 generates and outputs a fourth drive pulse d. The fourth drive pulse d is a pulse for transmitting a driving force stronger than the second drive pulse b to the rotor 22, and is output only when there is a large disturbance, such as power supply voltage that decreases rapidly. The fourth drive pulse d is output as a plurality of pulses. The details of the fourth drive pulse d will be described later.

The rotation convergence pulse generating circuit 77 outputs a rotation convergence pulse s. The rotation convergence pulse s is composed of a small pulse having driving force that is not enough to rotate one step. After the rotation detection pulse Sk, the pulse output is switched based on whether the rotation is determined. If the rotation of the rotor 22 is not completed and the subsequent pulse is output, an abnormal movement, such as two steps made at a time, may likely occur. The rotation convergence pulse s is a pulse for preventing abnormal movement. if the rotation is determined after the rotation detection pulse Sk ends, i.e. if a rotation has been made, the rotation convergence pulse s promotes the rotation of the rotor 22. In contrast, if the rotation is not determined after the rotation detection pulse Sk ends, i.e. if a rotation has not been made, the rotation convergence pulse s prevents the rotation of the rotor 22 and moves the rotor 22 back to the rest position at an early stage. The pulse for the next step is output while the rotation of the rotor is converged, and thus a stable, high-speed needle movement can be achieved. Desirably, the rotation convergence pulse is not one pulse but two or more chopper pulses. Two or more chopper pulses increase a range of time to prevent the rotation and allow the fluctuation in the driving force of the rotor 22 to some extent. Of course, the rotation convergence pulse s may be applied to the first embodiment.

The frequency selecting circuit 79 selects a period of one step from the start of the operation of the motor control unit 2 for a reverse rotation by one step to the start of the operation of the motor control unit 2 for a reverse rotation by one step in the next step. The frequency selecting circuit 79 selects a drive frequency that is the inverse as a period of one step.

In the selector 6, the partial drive pulse m, the response detection pulse Sm, the second drive pulse b, the rotation detection pulse Sk, the third drive pulse c, the fourth drive pulse d, and the rotation convergence pulse s are input. The selector 6 then outputs any one of these pulses to the driver circuit 7 based on the control of the logic circuit and the microcontroller included in the motor control unit 2.

The driver circuit 7 supplies a partial drive signal Dm, a second drive signal B, a third drive signal C, a fourth drive signal D, and a rotation convergence signal S to the terminals O1 and O2 of the coil 21 of the step motor 20. The partial drive signal Dm, the second drive signal B, the third drive signal C, the fourth drive signal D, and the rotation convergence signal S are respectively output in response to the partial drive pulse m, the second drive pulse b, the third drive pulse c, the fourth drive pulse d, and the rotation convergence pulse s that are input from the selector 6. The drive signal that is output when the rotor 22 is rotated by one step in the opposite direction is configured of a series of partial drive signals Dm. The polarity of the partial drive signals Dm included in a certain drive signal is the same.

When the response detection pulse Sm is entered from the selector 6, the driver circuit 7 controls a switch provided between the coil 21 and the response detecting circuit 41 so as to input the electromagnetic induced current generated in the O1 terminal and the O2 terminal of the coil 21 to the response detecting circuit 41. When the rotation detection pulse Sk is entered from the selector 6, the driver circuit 7 controls a switch provided between the coil 21 and the rotation detecting circuit 42 so as to the electromagnetic induced current generated in the O1 terminal and the O2 terminal of the coil 21 to the rotation detecting circuit 42.

The response detecting circuit 81 is a circuit for detecting the electromagnetic induced current generated in the coil 21 when the response detection pulse Sm is fed into the driver circuit 7. The response detecting circuit 41 includes a comparator, for example, and detects whether the electromagnetic induced current exceeding the threshold value mVt, which is determined based on the detection resistor, is generated.

The rotation detecting circuit 82 is a circuit for detecting the electromagnetic induced current generated in the coil 21 when the rotation detection pulse Sk is fed into the driver circuit 7. The rotation detecting circuit 42 includes a comparator, for example, and detects whether the electromagnetic induced current exceeding a threshold value kVt, which is determined based on a detection resistor, is generated. The rotation detecting circuit 42 determines whether the rotor 22 is rotated by one step in the opposite direction based on the detected electromagnetic induced current. If it is determined that the rotor 22 is not rotated, the rotation detecting circuit 42 controls the selector 6 to input a pulse to the driver circuit 7 for forcibly rotating the rotor 22. The details of this operation will be described later.

Figure 16:
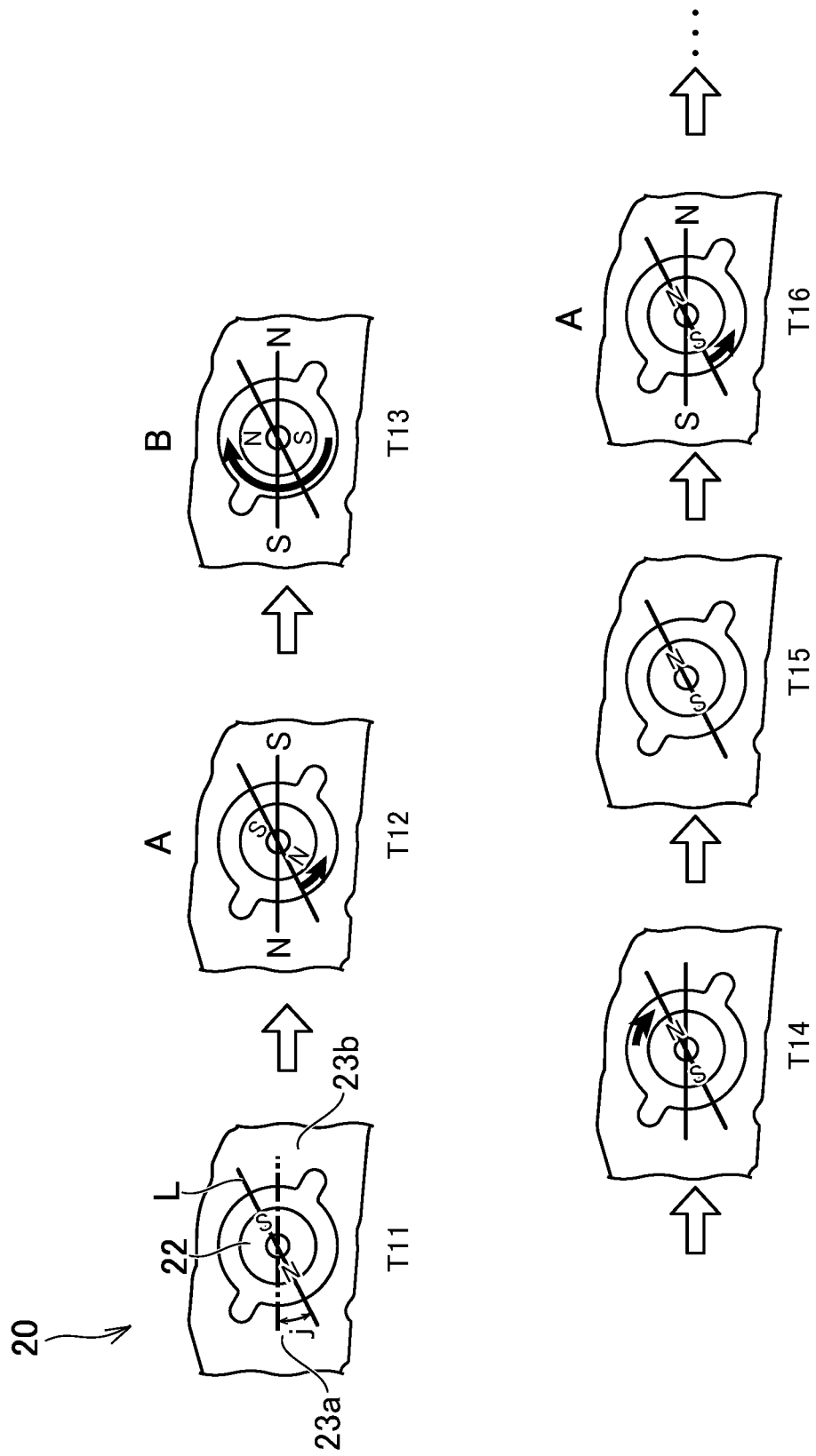
FIG. 16 is a diagram illustrating a rotation of a rotor in the same phase.

Next, an outline of the operation of the step motor 20 during the reverse rotation according to the embodiment of the present invention will be described. FIG. 16 is a diagram illustrating the rotation of the rotor 22 in the same phase and showing a change in the state of the rotor 22. The straight line L shows the position where the rotor 22 comes to rest by the holding force of the magnet when the coil 21 does not generate any magnetic force. The straight line L extends in the direction in which the line connecting the stators 23a and 23b is rotated by j° in the forward direction. The position where the rotor 22 comes to rest is the center at which the rotor 22 freely vibrates while being damped after the output of the drive pulse, and hereinafter referred to as "stable position." One step of the step motor 20 is a half rotation of the rotor 22, and the rotor 22 reaches a stable position every half rotation.

The time T11 is the initial state, and the rotor 22 is rest at a stable position. At time T12, the first drive signal A including a plurality of partial drive signals Dm is input to the coil 21 based on a plurality of partial drive pulses m. The coil 21 transmits the magnetic force of the first polarity to the rotor 22 through the stators 23a and 23b. The magnetic force of the first polarity causes the magnetic pole of the rotor 22 and the stators 23a and 23b to repel each other when in the same phase. This causes the rotor 22 to rotate slightly in the forward direction. It is determined whether the rotor 22 is the same phase or the opposite phase based on the signal interval between the partial drive signals Dm. In the example of FIG. 16, it is determined that the rotor 22 is the same phase.

If it is determined that the rotor 22 is the same phase, at time T13, the second drive pulse b is input to the driver circuit 7 and the second drive signal B, which rotates the rotor 22 to the next step in the opposite direction, is supplied to the coil 21. A magnetic force having a second polarity opposite to the first polarity is then generated in the coil 21, and is transmitted to the rotor 22. At time T13 and in the same phase, the magnetic force of the second polarity attracts the magnetic pole of the rotor 22 and the stators 23a and 23b. The magnetic force of the second polarity causes the rotor 22 to rotate in the opposite direction to the stable position in the next step due to inertia and the holding force of the magnet (time T14), and finally come to rest at the stable position in the next step (time T15). The polarity of the rotor 22 is reversed, and thus, when the rotor 22 is further rotated by one step in the opposite direction, the magnetic force of the opposite polarity to the previous step is supplied from the coil 21 (see time T16). That is, similarly to the forward rotation, the waveform of the signal output from the terminal O1 and the waveform of the signal output from the terminal O2 are switched at each step.

Figure 17:
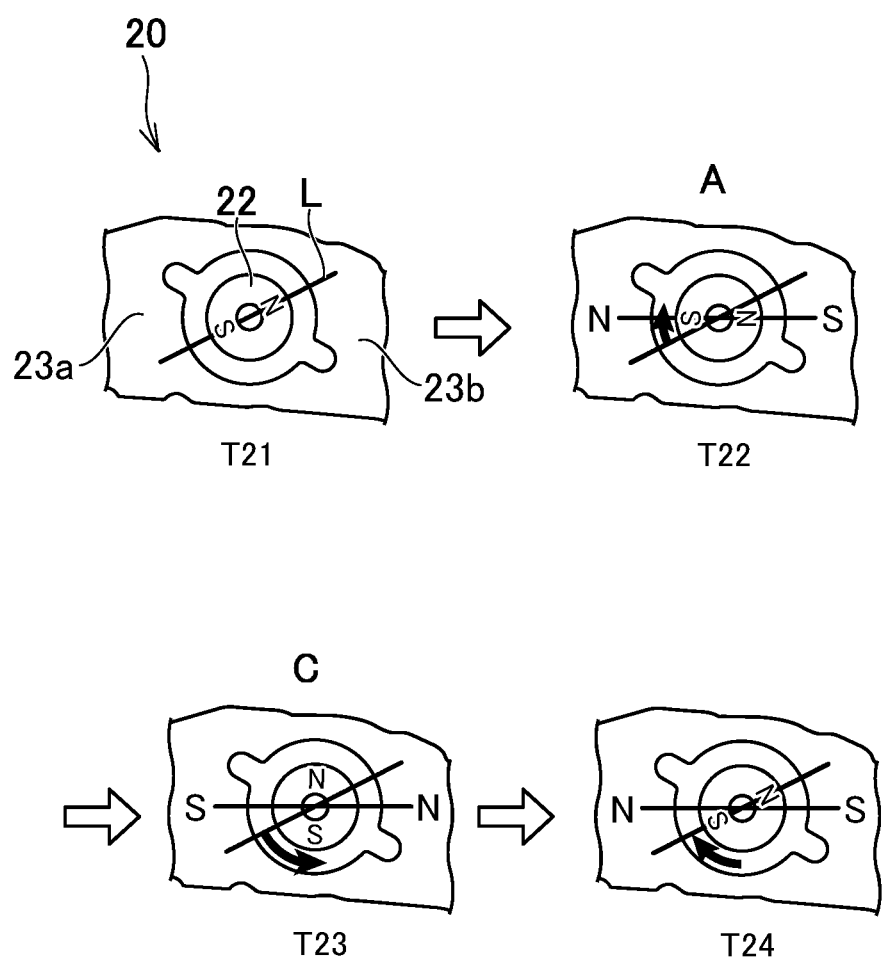
FIG. 17 is a diagram showing an operation of the rotor in the opposite phase.

FIG. 17 is a diagram showing the operation of the rotor 22 in the opposite phase. The time T21 is the initial state, and the rotor 22 is rest at the stable position. The phase assumed from the operation of the motor control unit 2 is the state at time T11 in FIG. 16, and the phase of the rotor 22 at time T21 is opposite to the phase assumed from the operation of the motor control unit 2 (opposite phase).

At time T22, the first drive signal A including a plurality of partial drive signals Dm is input to the coil 21 based on a plurality of partial drive pulses m. The coil 21 transmits the magnetic force of the first polarity to the rotor 22 through the stators 23a and 23b. Although the first polarity is the same as in the case of the same phase, the rotor 22 is the opposite phase at time T22, and thus the magnetic pole of the rotor 22 and the stators 23a and 23b are attracted to each other in the first polarity, and the rotor 22 slightly rotates in the opposite direction. It is then determined whether the rotor 22 is the same phase or the opposite phase based on the signal interval between the partial drive signals Dm. Here, the phase of the rotor 22 is determined to be the opposite phase.

Next, when it is determined the rotor is the opposite phase, the third drive pulse c is input to the driver circuit 7 and the third drive signal C is input to the coil 21 (time T23). The rotor 22 is controlled so as not to rotate by one step in the forward direction when the rotor 22 is the opposite phase. The rotor 22 eventually rotates toward the same stable position as before the first drive signal A is supplied (time T24). The duty ratio of the third drive pulse c is determined to generate the driving force that allows the rotor 22 to rotate by one step in the opposite direction when the rotor 22 is the same phase but determined to be the opposite phase.

Figure 18:
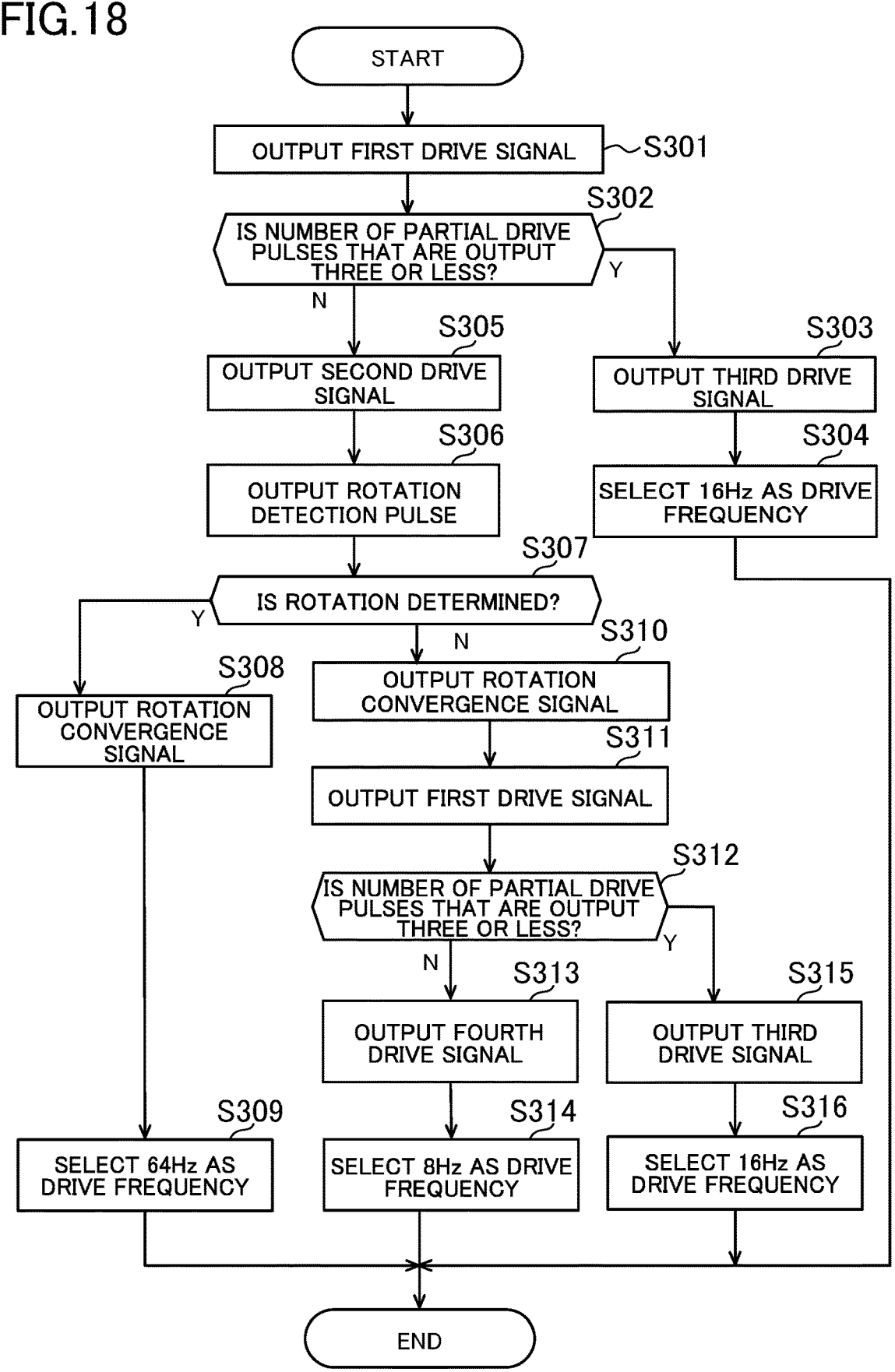
FIG. 18 is a flowchart showing an example of processing in the reverse rotation.
Figure 19:
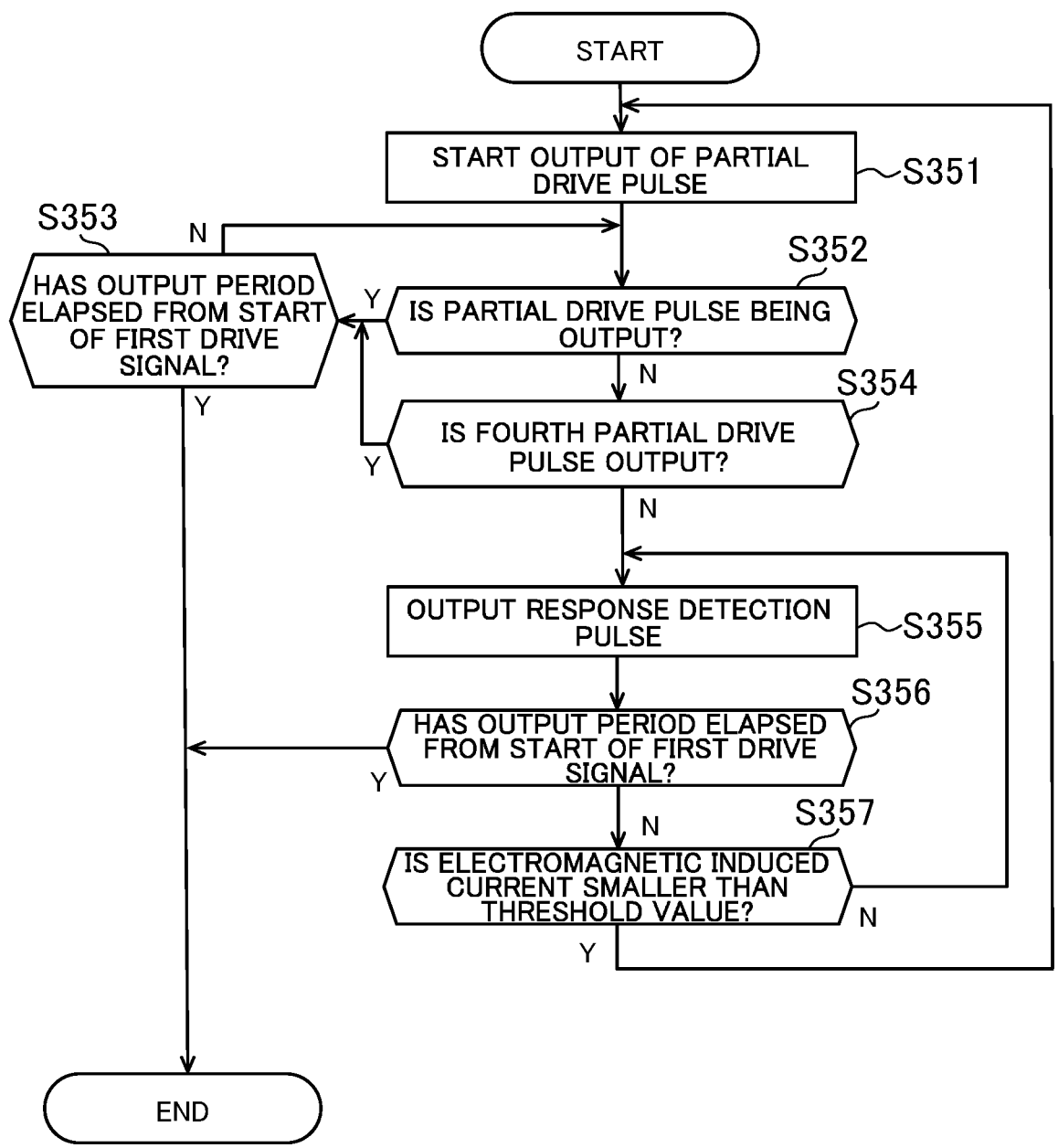
FIG. 19 is a flowchart showing an example of processing in the reverse rotation.

Next, the control at the time of the reverse rotation will be described in detail. FIGS. 18 and 19 are flowcharts showing an example of processing in the reverse rotation. FIG. 19 is a diagram showing the steps S301 and S311 of FIG. 18 in more detail. The processing shown in FIG. 18 is performed every time the rotor 22 is rotated by one step backward. The processing shown in FIGS. 18 and 19 is executed by the microcontroller included in the electronic timepiece 1 controlling the first drive pulse generating circuit 71, the response detection pulse generating circuit 72, the second drive pulse generating circuit 73, the rotation detection pulse generating circuit 74, the third drive pulse generating circuit 75, the fourth drive pulse generating circuit 76, the rotation convergence pulse generating circuit 77, the response detecting circuit 81, and the rotation detecting circuit 82, for example.

First, the motor control unit 2 executes the following processing for outputting the first drive signal A to the coil 21 (step S301). The first drive signal A includes a plurality of partial drive signals Dm corresponding to a plurality of partial drive pulses m. The count of the drive pulse counting circuit 70 is reset before the following processing.

The motor control unit 2 controls the first drive pulse generating circuit 71 to start generating and outputting a plurality of partial drive pulses m (step S351). The driver circuit 7, to which the partial drive pulses m are input, outputs a partial drive signal Dm to the coil 21. At this time, the drive pulse counting circuit 30 counts the number of outputs of the partial drive pulses m.

If the output period (2.25 ms in this case) has not elapsed from the start of the first drive signal A (N in step S353) while the partial drive pulses m are output (Y of the step S352), the motor control unit 2 repeats the processing from the step S352 onward until the output of the partial drive pulses m is completed.

If the output period has elapsed from the start of the first drive signal A (Y in step S353), the motor control unit 2 terminates the processing for outputting the first drive signal A.

Even if the output of the partial drive pulses m is completed (N in step S352), in a case where the fourth partial drive pulse m has been output in the output of the first drive signal A (Y in step S354), the processing proceeds to step S353 and the motor control unit 2 waits until the output period has elapsed.

When the output of the partial drive pulse m is completed (N in step S352) and the number of the partial drive pulses m that are already output is three or less (N in step S354), the response detection pulse generating circuit 72 outputs a response detection pulse Sm (step S355), and the response detecting circuit 81 detects whether the electromagnetic induced current at the output timing of the response detection pulse Sm is equal to or less than the threshold value mVt. If the output period has elapsed from the start of the first drive signal A (Y in step S356), the motor control unit 2 terminates the processing for outputting the first drive signal A, and if the output period has not elapsed from the start of the first drive signal A (N in step S356), it is further determined by the response detection pulse Sm whether the detected electromagnetic induced current is less than the threshold value mVt (step S357). If the electromagnetic induced current is smaller than the threshold value mVt (Y in step S357), the processing of the step S351 onward is executed so as to output the next partial drive pulse m. If the electromagnetic induced current is equal to or greater than the threshold value mVt (N in step S357), the processing of the step S355 onward is executed to output the next response detection pulse Sm.

When the processing shown in FIG. 19 is completed, the motor control unit 2 determines whether the phase assumed by the motor control unit 2 is the same as the actual phase of the rotor 22 based on the signal interval of the partial drive pulses m (corresponding to the partial drive signal Dm) that are output. More specifically, the motor control unit 2 determines whether the number of partial drive pulses m counted by the drive pulse counting circuit 70 is three or less (step S302).

If the number of the partial drive pulses m is three or less (Y in step S302), it is determined that the assumed phase and the actual phase of the rotor 22 are different (opposite phase), and the third drive pulse generating circuit 75 outputs a third drive pulse c. In response to the third drive pulse c, the driver circuit 7 outputs a third drive signal C (step S303). The frequency selecting circuit 79 selects 16 Hz as the drive frequency until the start of the next step (step S304). The drive frequency is set to be lower and a period of one step is longer than in the case of the normal opposite rotation in the same phase. That is, although the opposite phase is unlikely to occur in general, it is necessary to return to the same phase and to surely rotate the rotor in the next step. In order to ensure that the rotor 22 is at rest before the start of the next step, the period until the start of the next step is sufficiently longer than the case where the rotor normally rotates backward in the same phase.

On the other hand, if the number of the partial drive pulses m exceeds three (N in step S302), it is determined that the assumed phase and the actual phase of the rotor 22 are the same (same phase), and the second drive pulse generating circuit 73 outputs a second drive pulse b. In response to the second drive pulse b, the driver circuit 7 outputs a second drive signal B (step S305). The output period of the first drive signal A is constant, and thus the number of partial drive pulses m that are output within the output period indicates the signal interval of the partial drive pulses m. As such, the determination by the number of the partial drive pulses m can be said to be determined based on the signal interval of the partial drive pulses m.

The rotation detection pulse generating circuit 34 outputs rotation detection pulse Sk at a predetermined timing (step S306), and the rotation detecting circuit 82 determines whether the rotor 22 has rotated backward by one step in response to the electromagnetic induced force detected in accordance with the outputs (step S307). More specifically, among the rotation detection pulses Sk that are output three times, if the electromagnetic induced force is greater than the threshold value kVt for all three times, the rotation detecting circuit 82 determines the rotor has rotated in the opposite direction.

If it is determined to be the reverse rotation (Y in step S307), the rotation convergence pulse generating circuit 77 outputs a rotation convergence pulse s, and the driver circuit 7 outputs a rotation convergence signal S (step S308). The rotation convergence signal S is output to one of the terminals O1 and O2 so as to return the rotor 22 to the rest position at an early stage. Further, the frequency selecting circuit 79 selects 64 Hz as the drive frequency (step S309).

On the other hand, if it is determined not to be the reverse rotation (N in step S307), the rotation convergence pulse generating circuit 77 outputs a rotation convergence pulse s, and the driver circuit 7 outputs a rotation convergence signal S (step S310). In this regard, the rotation convergence signal S is output to one of the terminals O1 and O2, to which the rotation convergence signal S is not applied in step 308. This is because the polarity of the rotor 21 is different between the case where the rotor rotates backward and the case where the rotor does not rotate backward, and thus the polarity of the signal required to converge the rotation of the rotor 22 also needs to be changed.

When the rotation of the rotor 22 is prevented by the rotation convergence signal S, the motor control unit 2 outputs the first drive signal A again (step S311). This operation is the same as that of the step S301, and thus the explanation thereof is omitted.

Subsequently, the motor control unit 2 determines whether the number of partial drive pulses m counted by the drive pulse counting circuit 70 is three or less (step S312). If the number of partial drive pulses m is more than three (N in step S312), it is determined to be the same phase, and the fourth drive pulse generating circuit 76 generates and outputs a fourth drive pulse d and the driver circuit 7 outputs a fourth drive signal D to the coil 21 in order to rotate the rotor 22 more reliably (step S313). The required time is long and the period to the start of the next step needs to be longer, and thus the frequency selecting circuit 79 selects 8 Hz as the drive frequency (step S314). On the other hand, if the number of the partial drive pulses m is three or less (Y in step S312), it is determined to be the opposite phase, and the third drive pulse generating circuit 75 outputs a third drive pulse c. In response to the third drive pulse c, the driver circuit 7 outputs a third drive signal C (step S315). The frequency selecting circuit 79 selects 16 Hz as the drive frequency until the start of the next step (step S316).

Figure 20:
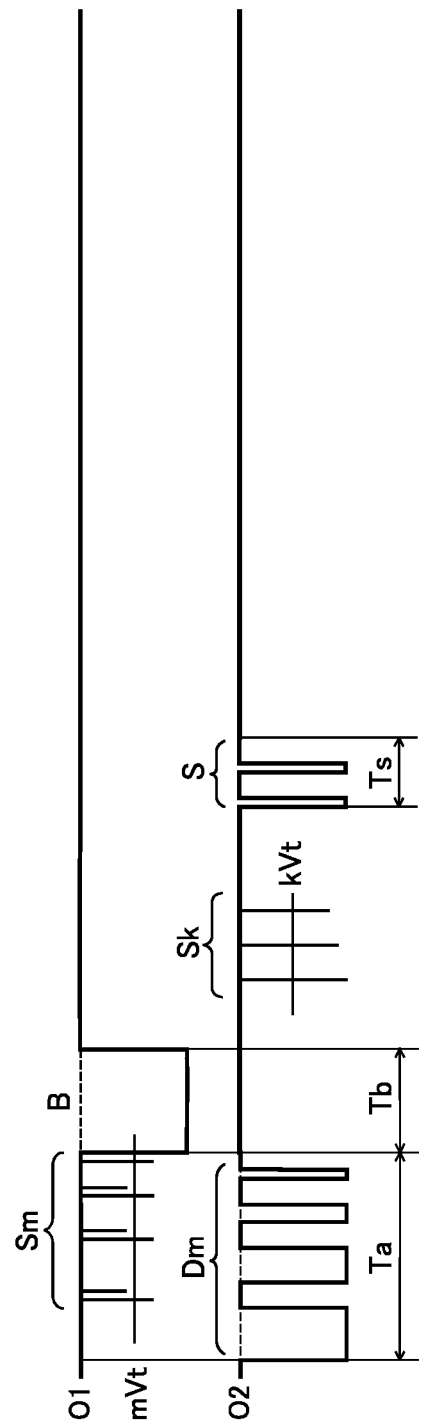
FIG. 20 is a waveform diagram showing an example of a pulse that is output when the rotor normally rotates backward in the same phase.

FIG. 20 is a waveform diagram showing an example of a pulse that is output when the rotor 22 normally rotates backward in the same phase. FIG. 21 is a waveform diagram showing an example of an electromagnetic induced current and the voltage at the terminals O1 and O2 when the pulse shown in FIG. 20 is input. In the examples of FIGS. 20 and 21, four partial drive signals Dm are applied to the coil 21 during the output period Ta of the first drive signal A. In the case of the same phase, the rotor 22 moves in the forward direction by the partial drive signal Dm. As such, the amount of rotational movement of the rotor 22 from the rest position is large, and the electromagnetic induced current is quickly reduced because the rotor 22 quickly returns to the original direction by the holding force of the magnet after the partial drive signal Dm is applied. For this reason, the number of response detection pulses Sm that are output until the detection of an electromagnetic induced current lower than the threshold value mVt is reduced and the signal interval of the partial drive pulses m and the partial drive signals Dm is narrowed. This increases the number of the partial drive signals Dm that are output during the output period Ta (the number of partial drive pulses m is also the same). In step S302 of FIG. 18, this mechanism is used to detect whether the rotor 22 is the same phase. The motor control unit 2 determines whether it is the same phase according to the signal interval, and changes the control method according to the determination result.

In the output period Ta of the first drive signal A, the respective pulse widths of the partial drive pulses m and the partial drive signals Dm that are output in accordance with the partial drive pulses m become shorter each time these are output. In this example, the output period Ta is 2.25 ms, and the pulse widths of the first to fourth partial drive signals Dm are 0.5 ms, 0.375 ms, 0.25 ms, and 0.125 ms, respectively. This enables to increase the amount of movement of the rotor 22 from the rest position using the pulses output in the first half and to easily detect the difference in the signal interval of the partial drive signal s Dm (partial drive pulses m) as a change in the partial drive signals Dm (partial drive pulses m) using the pulses output in the second half. As such, the signal interval of the partial drive signals Dm (partial drive pulse m) can be varied in the same phase and in the opposite phase so as to easily determine the phase. For example, the pulse widths of the second and subsequent partial drive signals Dm (partial drive pulses m) may be the same, or all of the pulse widths may be the same when the motor is resistant to external disturbance.

The pulse shape of the partial drive pulse m may vary depending on the power supply voltage. For example, when the power supply voltage is normal (in this case, 1.8V or higher), the pulse widths may be set as described in the above, and when the voltage is lower, the pulse widths of the first to fourth plural partial drive signals Dm (partial drive pulses m) may be 0.75 ms, 0.625 ms, 0.5 ms, and 0.375 ms, respectively. Further, there may be a period in which a fixed pulse is output before or after the first partial drive pulse m is output.

The interval between the response detection pulses Sm is 0.125 ms, and the pulse width is 15.625 us.

The examples in FIGS. 20 and 21 are determined as the same phase, and the second drive signal B is output. The pulse width of the second drive signal B (corresponding to the output period Tb here) is 1.5 ms. The three rotation detection pulses Sk are output at a detection interval of 0.5 ms, and it is determined in step S307 that the rotor is rotated by one step in the opposite direction. After 3 ms, the rotation convergence signal S is output. The rotation convergence signal may have different output start timings between the time when the rotation is determined and the time when the rotation is not determined.

The rotation convergence signal S is a chopper pulse group having a duty ratio of 8/32, and in the present embodiment, the number of chopper pulses that are output during the output period Ts (here, 1.0 ms) is 2. The rotation convergence signal S alone generates only a driving force enough to prevent the rotor 22 from rotating. The rotation convergence signal S that is output after the signal for rotating the rotor 22 is output can more promptly prevent the movement of the rotor 22, such as vibration.

Figure 22:
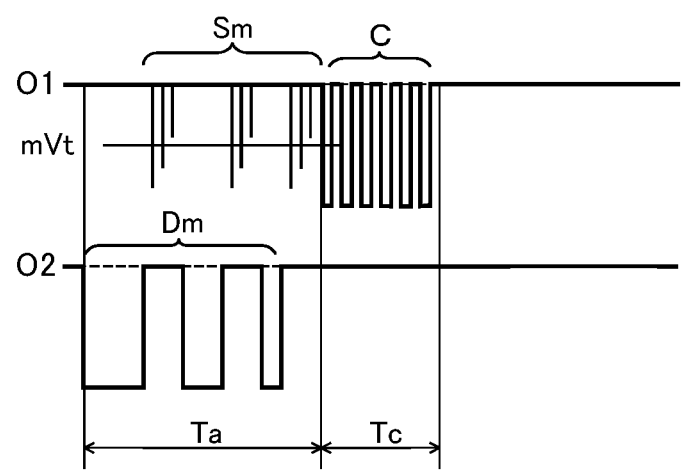
FIG. 22 is a waveform diagram showing an example of a pulse that is output when the rotor is the opposite phase.

FIG. 22 is a waveform diagram showing an example of a pulse that is output when the rotor 22 is the opposite phase. FIG. 23 is a waveform diagram showing an example of an electromagnetic induced current and the voltage at the terminals O1 and O2 when the pulse shown in FIG. 22 is input. In the examples of FIGS. 20 and 21, three partial drive signals Dm are applied to the coil 21 during the output period Ta of the first drive signal A. In a case of the opposite phase, the rotor 22 is moved in the opposite direction by the partial drive signal Dm, and thus the movement of the rotor 22 to return to the stable position becomes slow. This causes the electromagnetic induced current to drop more slowly than in the same phase. As such, the number of response detection pulses Sm that are output until the detection of an electromagnetic induced current lower than the threshold value mVt is increased, the signal interval of the partial drive pulses m and the partial drive signals Dm is wider, and the number of partial drive signals Dm is increased (the number of partial drive pulses m is also the same).

The examples of FIGS. 22 and 23 are determined as the same phase in step S302, and the third drive signal C is output during the output period Tc. The third drive signal C is a chopper pulse group having a duty ratio of 16/32. The width of each chopper pulse is 0.125 ms and the output period Tc is 1.5 ms.

Figure 32:
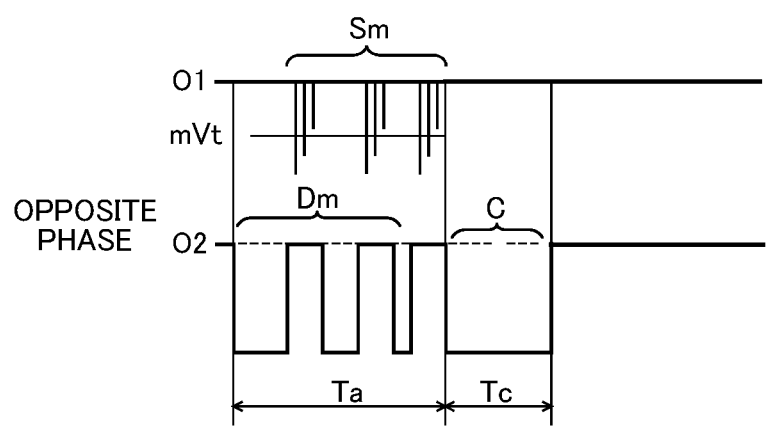
FIG. 32 is a waveform diagram showing an example of a signal that is output during the reverse rotation.
Figure 33:
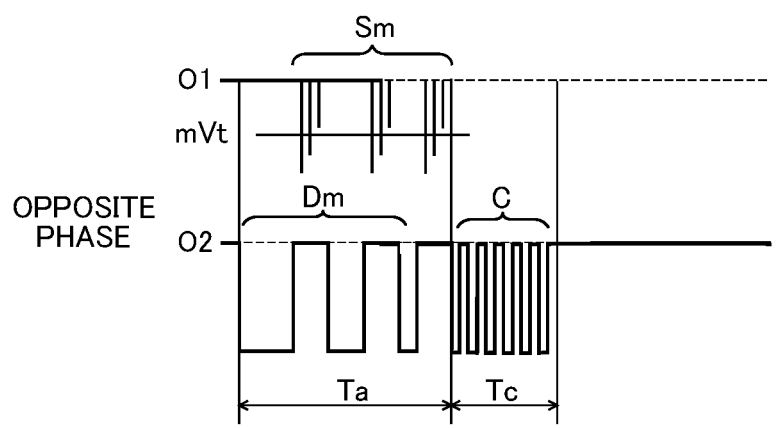
FIG. 33 is a waveform diagram showing an example of a signal that is output during the reverse rotation.
Figure 34:
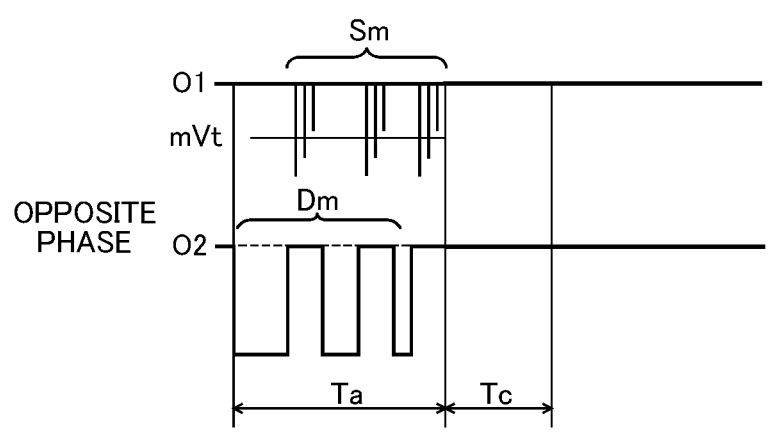
FIG. 34 is a waveform diagram showing an example of a signal that is output during the reverse rotation.
Figure 35:
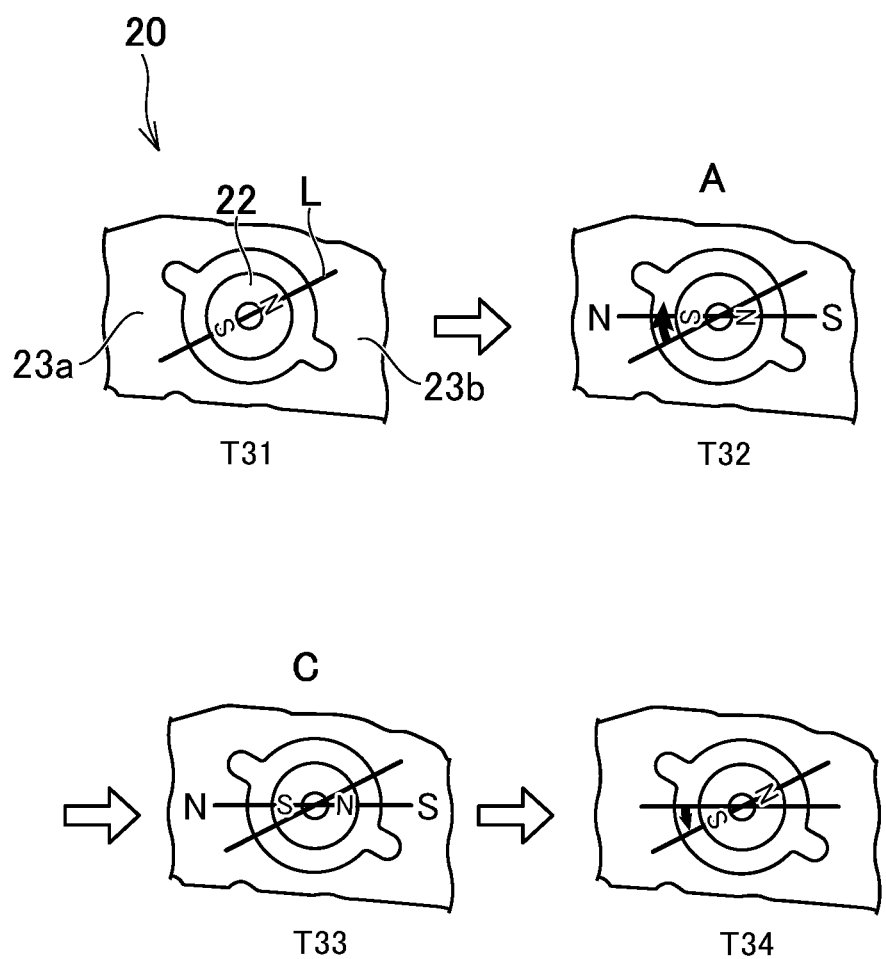
FIG. 35 is a diagram showing an operation of the rotor according to the signal shown in FIGS. 32 and 33.

The driving force of the third drive signal C is weaker than that of the second drive signal B and is set such that the rotor 22 never rotates in the forward direction in the opposite phase but rotates to some extent in the same phase. This prevents the rotor 22 from erroneously rotating in the forward direction in the opposite phase, and minimizes the impact when it is determined as the opposite phase where it is actually the same phase. The third drive signal C may be output to the terminal opposite to the second drive signal B in FIG. 20 as shown in FIGS. 32 and 33, and may not be output as shown in FIG. 34. In the example of FIG. 20, among the terminal O1 and O2 of the coil 20, the second drive signal B is output to the terminal O1 different from the first drive signal A, while in the example of FIGS. 32 and 33, the third drive signal C is output to the terminal O2 same as the first drive signal A. The polarity of the third drive signal C is opposite to that of the second drive signal B. FIG. 35 is a diagram showing an example of the rotation of the rotor 22 by the signal shown in FIGS. 32 and 33. The third drive signal C is output to the opposite terminal, and the rotor 22 is thereby returned to the rest position (see T33 in FIG. 35). This prevents the rotor 22 from erroneously rotating forward in the opposite phase and reduces abnormal movement of the hand where the opposite phase continues. As shown in FIG. 34, if there is no drive signal C, it is possible to output the next step faster and move the hand faster.

Figure 24:
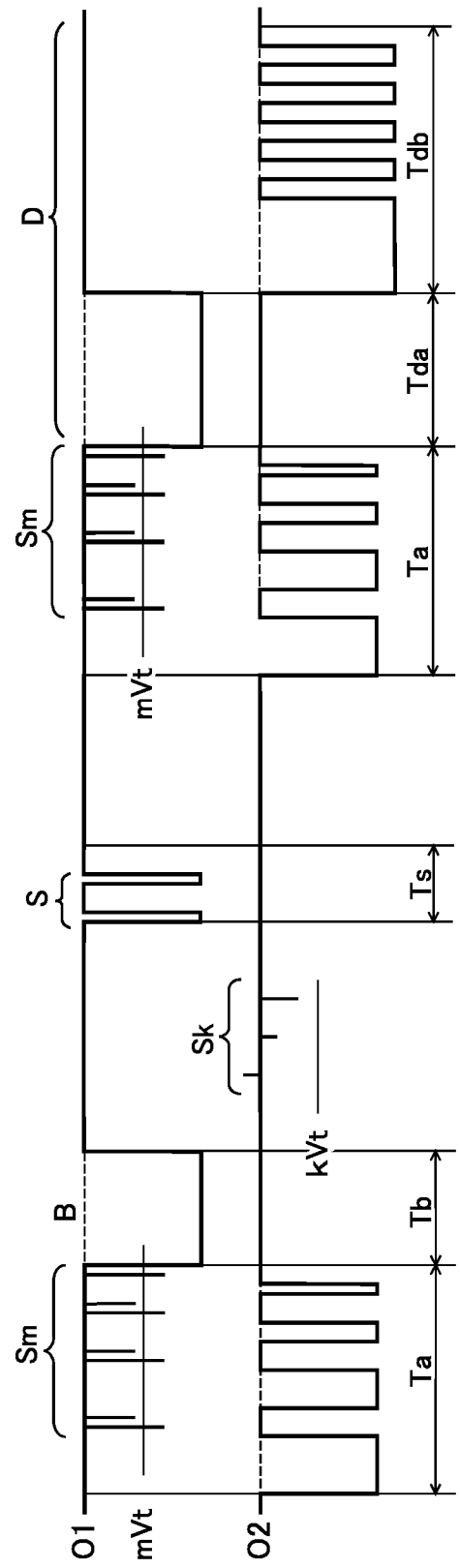
FIG. 24 is a diagram showing an example of a pulse that is output when no rotation is detected in the rotation detection.

FIG. 24 is a diagram showing an example of a pulse that is output when no rotation is detected in the rotation detection. FIG. 25 is a waveform diagram showing an example of an electromagnetic induced current and the voltage at the terminals O1 and O2 when the pulse shown in FIG. 24 is input.

FIGS. 24 and 25 show an example in which the phase is determined to be the same phase, but the rotation in the opposite direction is not possible due to a drop in the power supply voltage, for example. In this example, among the three times of determining the electromagnetic induced current by the three rotation detection pulses Sk after the second drive signal B is output, the electromagnetic induced current exceeding the threshold value kVt is not detected twice or more, and thus it is determined that the rotor is not rotated (N in step S307), and the rotation converging signal S is output to the terminal opposite to the example of FIG. 20. As such, after the operation of the rotor 22 is restricted, the partial drive signal Dm of the first drive signal A is output again after 32 ms from the first one of the partial drive signals Dm in the first drive signal A is output, and then the same phase is determined (N in step S312). Subsequently, the fourth drive signal D is output so as to more reliably rotate the rotor 22 in the opposite direction. The period during which the fourth drive signal D is output is divided into an output period Tda and an output period Tdb. In the output period Tda, the signal having the pulse width of 2.5 ms is output to the same terminal as the second drive signal B. In the output period Tdb, after 2.5 ms of a rest period, a 5.0 ms pulse and a subsequent 10 ms chopper pulse group are output to a terminal different from the output period Tda. The duty ratio of the chopper pulse group is 16/32 and the chopper pulse width is 0.25 ms. The pulse that is output in the output period Tda has a large driving force for reliable rotation. However, the rotor may excessively rotate due to disturbances such as power supply voltage. As such, the pulse that is output in the output period Tdb after the output period Tda acts for a rotation when the driving force is low due to a decrease in the battery voltage and acts for restricting the rotation of the rotor 22 when the rotor excessively rotates. This configuration serves to move the hand at high speed while reducing the power during normal operation, and reliably rotate the rotor 22 even when the battery voltage is lowered.

Figure 26:
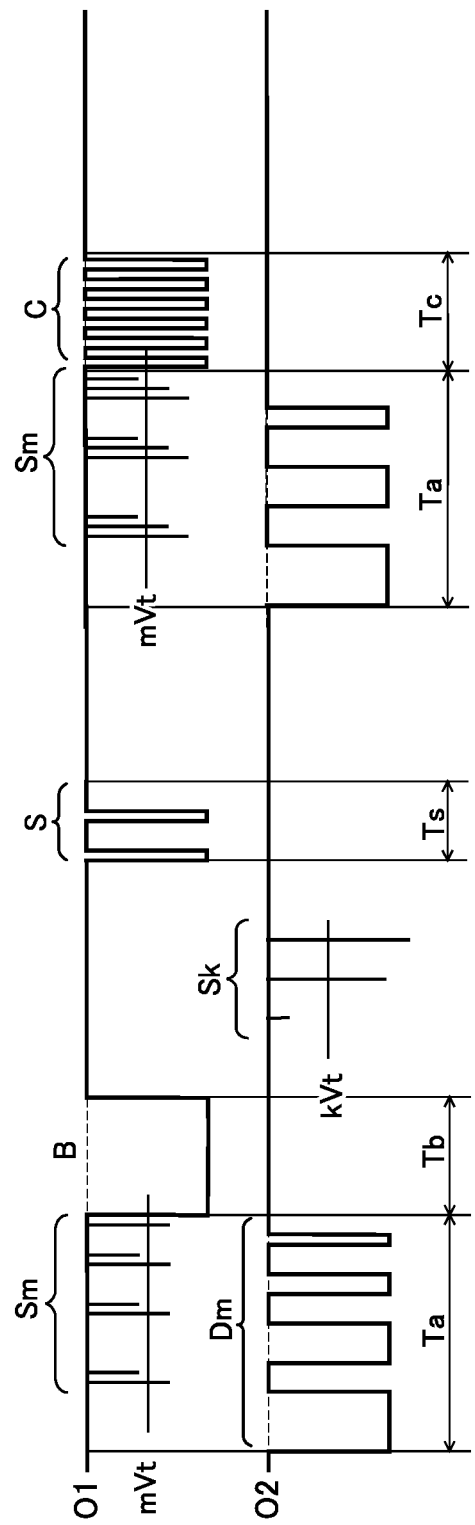
FIG. 26 is a diagram showing an example of a pulse that is output when it is erroneously determined that the rotor is not rotated.

FIG. 26 is a diagram showing an example of a pulse that is output when it is erroneously determined that the rotor is not rotated. FIG. 27 is a waveform diagram showing an example of an electromagnetic induced current and the voltage at the terminals O1 and O2 when the pulse shown in FIG. 26 is input.

FIGS. 26 and 27 show an example of a case where it is originally the same phase and determined that the rotor is not rotated in the rotation detection but the rotor is actually rotated. In particular, this pattern occurs when the rotation detection pulse Sk cannot be followed due to the high power supply voltage and excessive driving force. In the example of FIGS. 26 and 27, the rotor is rotating at the time when the rotation convergence signal S is output, and thus the state is substantially the opposite phase in the output period Ta of the second first drive signal A. In this case as well, the opposite phase is detected (Y in step S312) and the third drive signal C prevents the rotor from rotating erroneously in the forward direction. As described, it is possible to determine the opposite phase only by the output of the partial drive signal Dm in the second output period Ta, and thus it is easy to correspond to a case where the rotation is erroneously determined.

[Variation of Second Embodiment]

The same phase and the opposite phase of the first drive signal A may be determined by a method different from the method described above.

Figure 28:
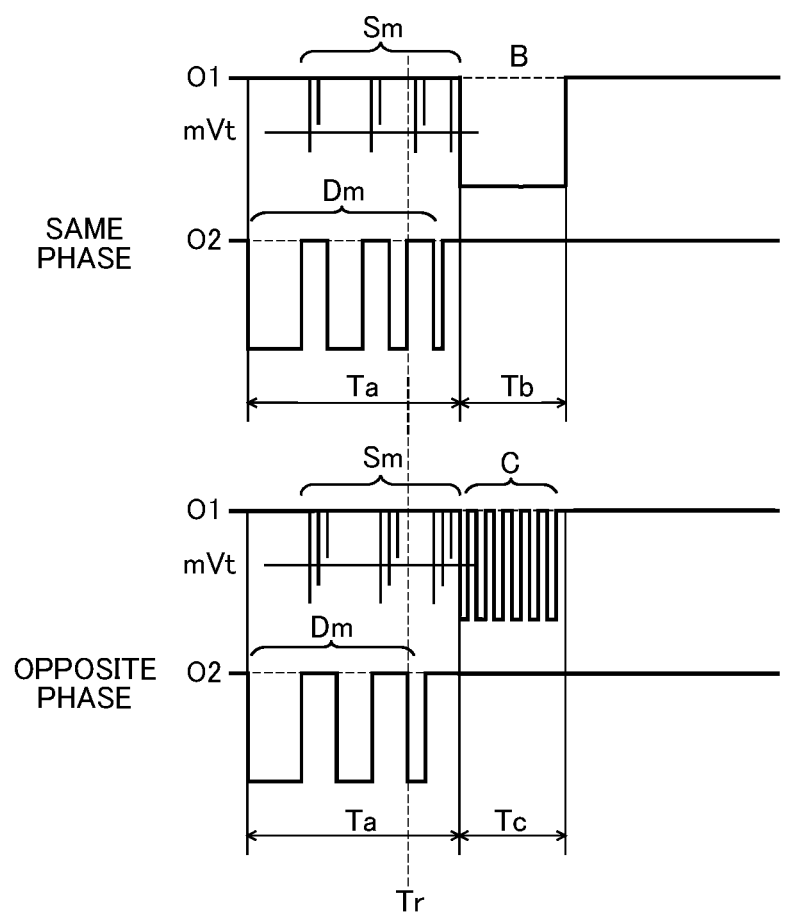
FIG. 28 is a diagram illustrating another example of the phase determination.

FIG. 28 is a diagram illustrating another example of the phase determination. In the example of FIG. 28, the drive pulse counting circuit 70 counts the number r1 of the partial drive signals Dm (partial drive pulses m) that are output before the reference time Tr and counts the number r2 of the partial drive signals Dm (partial drive pulses m) that are output after the reference time Tr, and the motor control unit 2 determines whether the rotor 22 is the same phase or the opposite phase based on the difference between r1 and r2. The characteristics of the output partial drive signal Dm is the same as those described so far.

In the example of FIG. 28, by the reference time Tr, three partial drive signals Dm are output when the rotor is the same phase, and two partial drive signals Dm are output when the rotor is the opposite phase. After the reference time Tr, only one partial drive signal Dm is output. As such, (r1−r2)=2 in the case of the same phase and (r1−r2)=1 in the case of the opposite phase. The motor control unit 2 can determine whether the rotor is the same phase or the opposite phase by determining whether (r1−r2) is 1 or less.

The drive pulse counting circuit 70 may count the number of response detection pulses Sm that are output in the output period Ta instead of the number of partial drive pulses m (partial drive signals Dm). In this case, the motor control unit 2 determines that the rotor is the opposite phase when the number of response detection pulses Sm is eight or more, for example, and the same phase when less than eight. Of course, the same phase or the opposite phase may be determined based on the number of response detection pulses Sm that are output by the reference time Tr, or the parameters may be changed depending on the situation of the actual step motor 20, for example.

Figure 29:
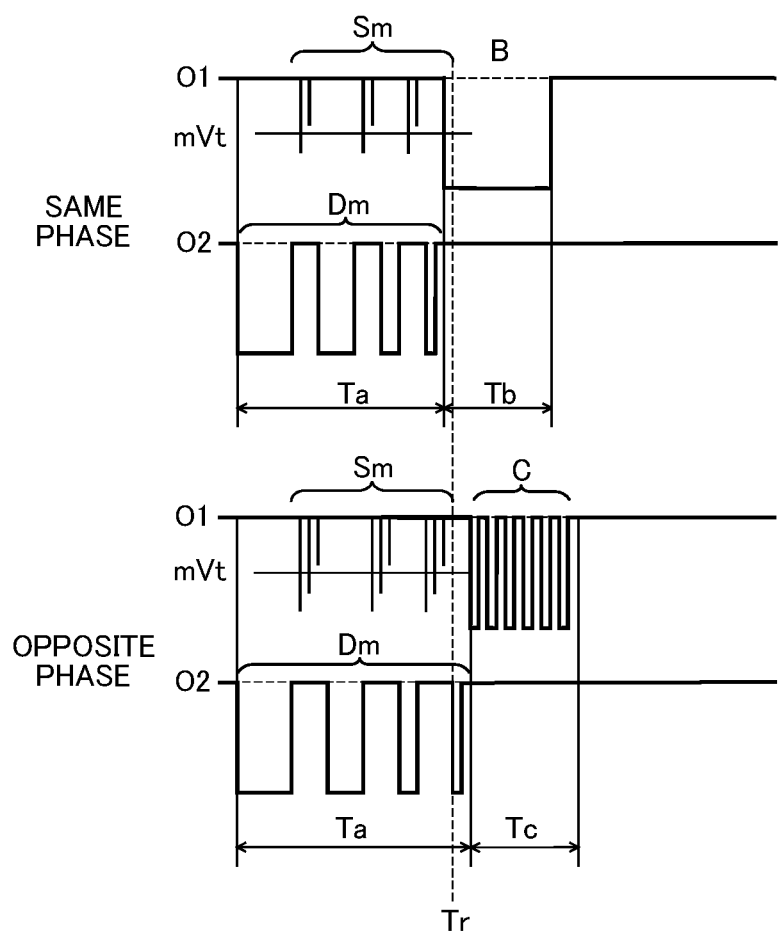
FIG. 29 is a diagram illustrating another example of the phase determination.

FIG. 29 is a diagram illustrating another example of the phase determination. In the example of FIG. 29, the output period Ta is variable, and the number of partial drive signals Dm (partial drive pulses m) that are output in the output period Ta is constant. The motor control unit 2 determines whether the rotor is the same phase according to the time when a particular partial drive signal Dm (partial drive pulse m) is output. In the example of FIG. 29, the motor control unit 2 provides a reference time Tr to be a threshold value, and determines whether the rotor is the same phase depending on whether the output of the fourth partial drive signal Dm is started earlier than the reference time Tr. For example, if the output of the fourth partial drive signal Dm is started earlier than the reference time Tr, it is determined that the rotor is the same phase, and if the output of the fourth partial drive signal Dm is started later than the reference time Tr, it is determined that the rotor is the opposite phase. Similarly to the example described above, the determination described in FIGS. 28 and 29 is made also based on the signal interval of the partial drive pulses m.

Figure 30:
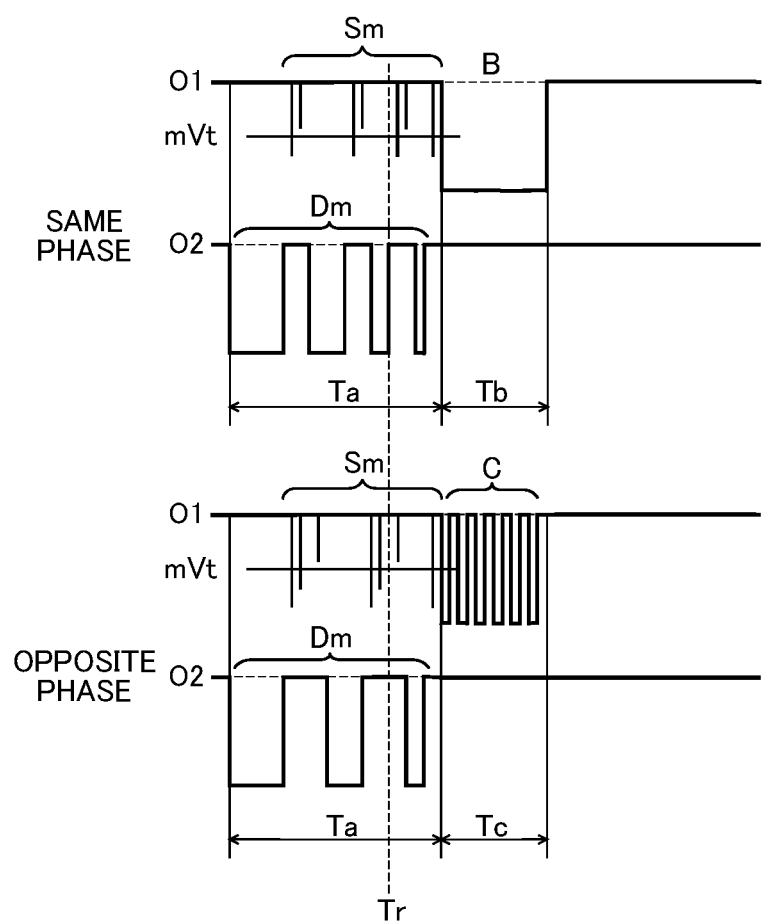
FIG. 30 is a diagram illustrating another example of the phase determination.

FIG. 30 is a diagram illustrating another example of the phase determination. In the example of FIG. 30, the response detection pulse generating circuit 72 changes the detection interval in accordance with the number of times of output of the response detection pulse Sm. The response detection pulse generating circuit 72 increases the interval (detection interval) between the response detection pulse Sm and the next response detection pulse Sm as the output number increases. For example, the detection interval until the first response detection pulse Sm is output is 0.125 ms, then the detection interval until the second response detection pulse Sm is output is 0.25 ms, and then the detection interval until the third response detection pulse Sm is output is 0.5 ms. This manner further delays the time of detecting when the attenuation of the electromagnetic induced current is slow. As such, the difference in the signal intervals of the partial drive signals Dm (partial drive pulses m) between the same phase and the opposite phase becomes larger, which serves to more reliably detect the difference of the phases.

In this example, the detection sensitivity of the electromagnetic induced current by the response detection pulse Sm is reduced. Instead of the detection interval, the pulse width of the response detection pulses Sm that are output from the response detection pulse generating circuit 72 may be narrowed as the number of outputs increases. For example, the pulse widths of the first to third response detection pulses Sm may be 62.5 us, 31.25 us, and 15.625 us, and the pulse widths of the fourth and subsequent pulses may be constant. Further, the threshold value mVt used by the response detecting circuit 81 to determine the electromagnetic induced current may be increased in accordance with an increase in the number of outputs of the response detection pulse Sm. For example, the threshold value mVt for the first to third response detection pulses Sm may be 4/8, 5/8, 6/8 of the power supply voltage.

It should be noted that the configuration diagrams, circuit diagrams, waveforms shown in the embodiments of the present invention are not limited to those described above, and can be changed as appropriate as long as the gist of the present invention is satisfied.

The invention claimed is:

1. A step motor drive device comprising:
a step motor including a rotor magnetized into two or more poles, a stator that transmits a magnetic force to the rotor, and a coil that generates a magnetic force to the stator;
a drive circuit that outputs a drive signal including a plurality of partial signals that are output intermittently;
a detecting circuit that detects an electromagnetic induced current that is generated in the coil after the partial signals are output; and
a control unit that controls the drive circuit, wherein
the drive circuit outputs one of the partial signals included in the drive signal to the coil, and, in response to a change in an electromagnetic induced current generated in the coil after the partial signal is output, outputs a next partial signal to the coil, and
the control unit controls an output of the drive circuit to the step motor based on a signal interval of the plurality of partial signals.

2. The step motor drive device according to claim 1, wherein
if the partial signal is output and then an electromagnetic induced current smaller than a threshold value is detected, the drive circuit outputs a next partial signal to the coil.

3. The step motor drive device according to claim 2, wherein
the threshold value is greater than 0.

4. The step motor drive device according to claim 2, wherein
the control unit determines whether the rotor rotates by one step based on whether a signal interval, which is between an output of one of the plurality of partial signals to the coil and an output of a next partial signal, exceeds a determination threshold value and, if it is determined that the rotor rotates by one step, prevents the next partial signal from being output and terminates the output of the drive signal.

5. The step motor drive device according to claim 4, further comprising a response detection pulse outputting unit that outputs one or more response detection pulses in order after the partial signal is output, wherein
if an electromagnetic induced current that is generated in the coil during a period in which the response detection pulses are output is smaller than the threshold value, the drive circuit outputs a next partial signal to the coil, and
the control unit determines whether the rotor rotates by one step based on whether a number of the response detection pulses, which are output after one of the plurality of partial signals is output to the coil, exceeds the determination threshold value.

6. The step motor drive device according to claim 5, wherein
the control unit changes intensity of a drive signal to be output next based on the number of partial signals that are output until the output of the drive signal is terminated.

7. The step motor drive device according to claim 5, wherein
in response to the number of the partial signals that are output, the drive circuit changes the threshold value or an interval for detecting an electromagnetic induced current smaller than the threshold value.

8. The step motor drive device according to claim 1, wherein
the control unit determines whether a phase of the rotor is a desired phase based on the signal interval of the plurality of partial signals, and
if the phase is the desired phase, the control unit controls the drive circuit by a first drive method in which the drive circuit outputs a subsequent drive signal for rotating the rotor by one step in an opposite direction, and if the phase is not the desired phase, the control unit controls the drive circuit by a second drive method different from the first drive method so as to restrict the rotation of the rotor.

9. The step motor drive device according to claim 8, wherein
the drive signal is output during a predetermined output period, and
the control unit determines whether the phase of the rotor is the desired phase based on a number of the partial signals that are output during the output period.

10. The step motor drive device according to claim 8, wherein
the control unit determines whether the phase of the rotor is the desired phase based on a time at which a predetermined number of the partial signals are output.

11. The step motor drive device according to claim 8, further comprising a response detection pulse outputting unit that outputs one or more response detection pulses in order after the partial signal is output, wherein
if an electromagnetic induced current that is generated in the coil during a period in which the response detection pulses are output is smaller than a threshold value, the drive circuit outputs a next partial signal to the coil, and
the control unit determines whether the phase of the rotor is the desired phase based on a number of the response detection pulses that are output.

12. The step motor drive device according to claim 11, wherein
a first partial signal of the plurality of partial signals is longer than other partial signals.

13. The step motor drive device according to claim 11, wherein
the control unit increases the threshold value each time the partial signal is output.

14. The step motor drive device according to claim 8, further comprising a response detection pulse outputting unit that outputs one or more response detection pulses in order after the partial signal is output, wherein
the detecting circuit detects whether an electromagnetic induced current that is generated in the coil during a period in which the response detection pulses are output is smaller than a threshold value, and
the response detection pulse outputting unit changes an interval or a width of the response detection pulse to be output in response to a number of the partial signal that is output immediately before.

15. The step motor drive device according to claim 8, wherein
if the determined phase is not the desired phase, the control unit controls the drive circuit to output a preparatory drive signal for rotating the rotor by one step in the opposite direction when the rotor is a same phase.

16. The step motor drive device according to claim 15, wherein
the preparatory drive signal generates a smaller driving force in the rotor than the subsequent drive signal.

17. The step motor drive device according to claim 8, wherein
if the determined phase is not the desired phase, the control unit controls the drive circuit to output a preparatory drive signal to a terminal, which is not a terminal to which the subsequent drive signal is output, of two terminals of the coil.

18. The step motor drive device according to claim 8, wherein
if the determined phase is not the desired phase, the control unit controls the drive circuit not to output a signal for driving the rotor to the coil.

19. The step motor drive device according to claim 1, further comprising a response detection pulse outputting unit that outputs one or more response detection pulses in order after the partial signal is output, and
a rotation detection pulse outputting unit that outputs a plurality of rotation detection pulses in order after the drive signal is output, wherein
if an electromagnetic induced current that is generated in the coil during a period in which the response detection pulses are output is smaller than the threshold value, the drive circuit outputs a next partial signal to the coil,
the control unit determines whether the rotor rotates by one step based on an electromagnetic induced current that is generated in the coil during a period in which the rotation detection pulses are output, and
an interval at which the response detection pulses are output is smaller than an interval at which the rotation detection pulses are output.

20. A step motor drive device comprising:
a step motor including a rotor magnetized into two or more poles, a stator that transmits a magnetic force to the rotor, and a coil that generates a magnetic force to the stator;
a drive circuit that outputs, to the coil, a series of drive signals for rotating the rotor in an opposite direction; and
a control unit that controls the drive circuit, wherein
the control unit detects whether the rotor rotates by one step in the opposite direction after the drive signal is output, and
the drive circuit outputs, to the coil, a first convergence signal for facilitating a forward rotation of the rotor if the rotation by one step in the opposite direction is detected, and outputs, to the coil, a second convergence signal for restricting the rotation of the rotor if the rotation in the opposite direction is not detected.

21. The step motor drive device according to claim 20, wherein
the drive circuit outputs, to a first end of the coil, the first convergence signal for facilitating the forward rotation of the rotor if the rotation by one step in the opposite direction is detected, and outputs, to a second end of the coil, the second convergence signal for restricting the rotation of the rotor if the rotation in the opposite direction is not detected.

* * * * *